(12) United States Patent
Janssen

(10) Patent No.: US 8,635,100 B2
(45) Date of Patent: Jan. 21, 2014

(54) SYSTEM AND METHOD FOR GENERATING MULTI-PHASE CONSTRUCTION PLANS

(76) Inventor: Craig N. Janssen, Lewisville, TX (US)

( * ) Notice: Subject to any disclaimer, the term of this patent is extended or adjusted under 35 U.S.C. 154(b) by 0 days.

(21) Appl. No.: 10/743,204

(22) Filed: Dec. 22, 2003

(65) Prior Publication Data

US 2005/0137931 A1    Jun. 23, 2005

(51) Int. Cl.
*G06Q 30/00* (2012.01)
*G06Q 10/00* (2012.01)
*G06Q 20/04* (2012.01)

(52) U.S. Cl.
CPC .................... *G06Q 20/042* (2013.01)
USPC ............. 705/10; 705/7.13; 705/7.23; 705/40; 705/400

(58) Field of Classification Search
CPC .................................................. G06Q 20/042
USPC ........ 705/1, 9, 36–38, 400, 40, 7, 35, 1.1, 27, 705/30, 7.13, 7.23, 8, 20, 315; 707/200; 703/1; 708/8
See application file for complete search history.

(56) References Cited

U.S. PATENT DOCUMENTS

| | | | | |
|---|---|---|---|---|
| 6,154,730 A * | 11/2000 | Adams et al. | | 705/36 R |
| 6,446,053 B1 * | 9/2002 | Elliott | | 705/400 |
| 6,765,594 B2 * | 7/2004 | Hautt et al. | | 715/764 |
| 6,859,768 B1 * | 2/2005 | Wakelam et al. | | 703/1 |
| 6,922,701 B1 * | 7/2005 | Ananian et al. | | 1/1 |
| 2002/0099725 A1 * | 7/2002 | Gordon | | 707/200 |
| 2002/0128934 A1 * | 9/2002 | Shaer | | 705/27 |
| 2002/0147623 A1 * | 10/2002 | Rifaat | | 705/7 |
| 2003/0115163 A1 * | 6/2003 | Moore et al. | | 705/500 |
| 2003/0135401 A1 * | 7/2003 | Parr | | 705/8 |
| 2003/0233267 A1 * | 12/2003 | Hertel-Szabadi | | 705/9 |
| 2003/0233303 A1 * | 12/2003 | Elazouni | | 705/36 |
| 2004/0205519 A1 * | 10/2004 | Chapel et al. | | 715/502 |
| 2005/0033673 A1 * | 2/2005 | Graham | | 705/35 |
| 2008/0004844 A1 * | 1/2008 | Kefford et al. | | 703/1 |

FOREIGN PATENT DOCUMENTS

AU        2002100177 A1 *  5/2000
AU         200221286 A1 * 12/2002

OTHER PUBLICATIONS

Christianitytoday.com "What to Ask Your Builder", Mar./Apr. 2000.*
Kazaz et al., "Project Scheduling with Discounted Cash Flows and Progress Payments", 1996, Journal of the operational research Society, pp. 1262-1272.*
Smith-Daniels et al., "Maximizing the net present value of a project to materials and capital constraints", Oct. 1987, (2 page abstract).*
Easa, Said M., "Resource Leveling in Construction by Optimization", Jun. 1989, Journal of Construction Engineering and Management, vol. 115, No. 2. pp. 302-315.*

(Continued)

*Primary Examiner* — John Hayes
*Assistant Examiner* — Freda A Nelson

(57) ABSTRACT

A method includes identifying a plurality of facilities in a complex. Each facility is associated with a construction project. The method also includes determining a potential revenue associated with at least one of the facilities. The method further includes determining a cost associated with at least one of the facilities. In addition, the method includes generating a schedule of the construction projects using the identified potential revenue and the identified cost.

30 Claims, 19 Drawing Sheets

(56) References Cited

OTHER PUBLICATIONS

Russell, Robert A., A Comparison of Heuristics for Scheduling Projects with Cash Flows and Resource Restrictions, Oct. 10, 1986, Management Science, vol. 32, No. 10, pp. 1291-1300.*
Padman et al., "Heuristics Scheduling of resource-Constrained Projects with Cash Flows and Resource", Heinz School of Public Policy and Management, Carnegie Mellon University, pp. 365-381.*
Botts, Marc S., Churches on the grow have funding options available, Sep. 26, 2003, Chruchcentral.com, 4 pgs.*
"Building God's Way Institute", Nov. 15, 2003, Demien Construction. Vision in Focus, 2 pgs.*
"Final Report of the Long-Range planning Group of the Trinity Lutheran Church council", Apr. 30, 2001; 19 pgs.*
Odom et al., "Environment, Planning Processes, and Organizational Performance of Churches", Mar.-Apr. 1988, Strategic Management Journal, vol. 9, No. 2, pp. 197-205.*
Iannaccone et al., "Religious Resources and Church Growth", Dec. 1995, Social Forces, 38 pgs.*
Roberts, Julie, "Church Buildings Become Ministry Tools", May 31, 2002, churchcentral.com, 4 pages.*
Christianitytoday.com; "What to Ask Your Builder", Mar./Apr. 2000.*
Churchgrowthsoftware.com (Mar. 21, 2003).*
Botts, Marc S., Churches on the Grow Have Funding Options Available, Sep. 26, 2003, Chruchcentral.com, 4 pgs.*
"Church Acquires Unique Funding for New Building", Mar. 6, 2003, Churchcentral.com 2 pgs.*
Roberts, Julie, Church Building Become Ministry Tools, May 31, 2002, Churchcentral.com, 4 pgs.*
"Building God's Way Institute", Nov. 15, 2003, Demien Construction. Vision in Focus, 2 pgs.*
"Lafayette Church of Christ Signs on to Building God's Way", Oct. 2003, Demien Construction. Nehemian newsletter, 2 pgs.*
"Final Report of the Long-Range planning Group of the Trinity Lutheran Church Council", Apr. 30, 2001; 19 pgs.*
Bishop, Randy, "How Much Should They Give", Mar./Apr. 2000, Christianitytoday.com, 5 pgs.*
"Calvary Chapel Launches $10.5 Million Building Project", Feb. 10, 2003, Churchcentral.com, 2 pgs.*
Kazaz et al., "Project Scheduling with Discounted Cash Flows and Progress Payments", Jan. 1996, Journal of the Operational Research Society, pp. 1262-1272.*
Padman et al., "Heuristics Scheduling of Resource-Constrained Projects with Cash Flows and Resource", Mar. 1995, Heinz School of Public Policy and Management, Carnegie Mellon University, pp. 365-381.*

* cited by examiner

Total Campus Count-Peak Attendance

| | Attendance | Parking | 610 % | 414a | 414b | 414c | |
|---|---|---|---|---|---|---|---|
| 604 | Sanctuary High Attendance | | | 3200 | 4400 | 5400 | 0 |
| 606 | Adult Education | | 33% | 1056 | 1452 | 1782 | |
| 608 | Childrens/Youth | | 49% | 1554 | 2137 | 2623 | |
| 612 | All Facilities Totals | | | 5810 | 7989 | 9805 | |

"%" is a percentage of Sanctuary attendance added to get all facilities total

| | Parking Requirements | | People/Car | 414a | 414b | 414c | |
|---|---|---|---|---|---|---|---|
| 616a | Parking (Real)* | | 1.3 | 2462 | 3385 | 4154 | 0 |
| 616b | Parking (Code)* | 618→ | 3.0 | 1067 | 1457 | 1800 | |

"Code" calculation is based on Sanctuary Capacity (people/car)
"Real" Calculation is based on actual Attendance (people/car)

| 622 Square Footage | | Floors | Gross Factor | % of Atten. | Room/# People | Square Footage | 414a | 414b | 414c | | Reusable space |
|---|---|---|---|---|---|---|---|---|---|---|---|
| Main Sanctuary | ☑ | 1 | 1.5 | | | 15 | 3,200 | 4,400 | 5,400 | 0 | |
| | ☐ | 1 | 1.5 | | | 15 | 89,000 | 111,000 | 110,000 | | |
| Chapel | ☑ | 1 | 0.22 | | | 500 | 12,700 | 12,700 | 12,700 | | |
| Atrium | ☑ | 1 | 1.0 | | | 4 | 15,000 | 20,000 | 25,000 | | |
| | ☐ | 1 | 1.0 | | | 15 | | | | | |
| Adult Education | ☑ | 2 | 1.3 | | | 20 | (24,000) | (9,000) | 1,000 | | 52,500 |
| | ☐ | 1 | 2.0 | | | 16 | | | | | |
| Childrens/Youth Education | ☑ | 2 | 1.3 | | | 27 | 63,000 | 87,000 | 102,000 | | |
| Childrens/Youth Education | ☑ | 2 | 1.3 | | | 27 | (24,000) | | 20,000 | | 87,000 |
| | ☐ | 1 | 1.3 | | | 27 | | | | | |
| Administration/Staff | ☑ | 1 | 1.5 | | 51 | 97 | 60,000 | (2,000) | 1,000 | | 23,000 |
| | ☐ | 1 | 1.5 | | 50 | 125 | | | | | |

FIG. 6A

| | | Floors | Gross. | | Sqft/Unit | | | | {620 / 638 / 640} |
|---|---|---|---|---|---|---|---|---|---|
| Gymnasium | ☑ 1 | | | | | 15400 | 17,250 | 17,250 | 17,250 | |
| Existing Building | ☑ 2 | 1 | | | | 88089 | 101,200 | 101,200 | 101,200 | |
| Music Rehearsal | ☑ 1 | 1.0 ◄► | ◄► | 300 ◄► | | 13 | 8,000 | 10,000 | 11,000 | |
| Music Rehearsal | ☑ 1 | 1.0 ◄► | ◄► | 300 ◄► | | 22 | 5,000 | 8,000 | 11,000 | 8000 |
| A/V Production/Backstage | ☑ 1 | 2.0 ◄► | ◄► | Advanced A/V | | | 2,700 | 3,600 | 4,400 | |
| A/V Production/Backstage | ☑ 1 | 2.0 ◄► | ◄► | Advanced A/V | | | 100 | 1,000 | 1,800 | 2600 |
| Youth Facility | ☑ 1 | 1.5 ◄► | ◄► | | | 20 | 6,900 | 10,350 | 12,650 | |
| | ☑ 1 | 1.0 ◄► | ◄► | | | 31 | | | | |
| | ☐ 1 | 1.0 ◄► | ◄► | | | 15 | | | | |
| | ☐ 1 | 1.0 ◄► | 50% ◄► | | | 30 | | | | |
| Kitchen | ☑ 1 | 1.0 ◄► | ◄► | Kitchen 2 | | | 4,025 | 4,945 | 5,635 | |
| Incubator Church Suite 1 | ☑ 1 | 24 ◄► | ◄► | | 500 | | 575 | 575 | 575 | 11500 |
| Incubator Church Suite 2 | ☑ 1 | 24 ◄► | ◄► | | 500 | | 575 | 575 | 575 | 11500 |

| Grounds Area | | Floors | Gross. | | Sqft/Unit | | | | Reusable space |
|---|---|---|---|---|---|---|---|---|---|
| Parking | ☑ | 1.0 ◄► | 60% ◄► | | 405 ◄► | 193,200 | 417,600 | 604,200 | 405000 |
| Parking | ☐ | 1.0 | ◄► | | 405 ◄► | 803,800 | 953,400 | 1,077,800 | |
| Green Space | ☑ | 1.0 | 25% ◄► | | | 116,000 | 199,000 | 269,000 | |
| Recreation | ☑ | 1.0 | ◄► | Softball Field | | 60,000 | 60,000 | 60,000 | |
| Recreation | ☑ | 1.0 | ◄► | Soccer Field | | 90,000 | 90,000 | 90,000 | |
| Recreation | ☐ | 1.0 | ◄► | Soccer Field | | | | | |

Space Summary  Grossing 15% ◄►

| | | | |
|---|---|---|---|
| Built Sqft. | 269,000 | 380,000 | 473,000 |
| Built Acreage | 4.80 | 6.70 | 8.20 |
| Parking Acreage | 22.90 | 31.50 | 38.60 |
| Greenspace Acreage | 2.70 | 4.60 | 6.20 |
| Total Campus Acreage | 33.80 | 46.20 | 56.40 |

FIG. 6B

| Dollars | Phase | SC | $/Sqft | 3200 | 4400 | 5400 | | |
|---|---|---|---|---|---|---|---|---|
| Main Sanctuary | 1 | 3200 | 150 | $12,450,000 | $17,100,000 | $21,000,000 | | |
| | 1 | 1867 | 90 | | | | | |
| Chapel | 3 | 3200 | 160 | $2,032,000 | $2,032,000 | $2,032,000 | | |
| Atrium | 1 | 3200 | 110 | $1,650,000 | $2,200,000 | $2,750,000 | | |
| | 2 | 3300 | 90 | | | | | |
| Adult Education | 3 | 5400 | 100 | ($2,100,000) | ($900,000) | $100,000 | | |
| | 2 | 1867 | 90 | | | | | |
| Childrens/Youth Education | 2 | 4400 | 90 | $5,670,000 | $7,830,000 | $9,630,000 | | |
| Childrens/Youth Education | 3 | 5400 | 90 | ($2,160,000) | | $1,800,000 | | |
| | 2 | 3300 | 90 | | | | | |
| Administration/Staff | 3 | 5400 | 90 | ($540,000) | ($180,000) | $90,000 | | |
| | 4 | 3300 | 90 | | | | | |
| Gymnasium | 3 | 5400 | 80 | $1,380,000 | $1,380,000 | $1,380,000 | | |
| Existing Building | 1 | 3300 | 0.1 | $10,120 | $10,120 | $10,120 | | |
| Music Rehearsal | 1 | 3200 | 110 | $880,000 | $1,100,000 | $1,210,000 | | |
| Music Rehearsal | 3 | 5400 | 110 | $550,000 | $880,000 | $1,210,000 | | |
| A/V Production/Backstage | 1 | 3200 | 110 | $297,000 | $396,000 | $484,000 | | |
| A/V Production/Backstage | 3 | 5400 | 110 | $11,000 | $110,000 | $198,000 | | |
| Youth Facility | 4 | 5400 | 90 | $621,000 | $931,500 | $1,138,500 | | |
| | 3 | 3300 | 90 | | | | | |
| | 3 | 3300 | 90 | | | | | |
| | 3 | 3300 | 90 | | | | | |
| Kitchen | 4 | 5400 | 240 | $966,000 | $1,186,800 | $1,352,400 | | |
| Incubator Church Suite 1 | 2 | 3200 | 100 | $57,500 | $57,500 | $57,500 | | 0 |
| Incubator Church Suite 2 | 2 | 3200 | 100 | $57,500 | $57,500 | $57,500 | | 11638000 |

FIG. 6C

| Equipment Costs | | | | | | | | |
|---|---|---|---|---|---|---|---|---|
| | | | | | $21,832,120 | $34,191,420 | $44,500,020 | |
| Advanced sound | ☑ | ◁▷ | 3200 | | $450,000 | $780,000 | $960,000 | $1,110,000 |
| Lighting | ☑ | ◁▷ | 3200 | | $100,000 | $170,000 | $210,000 | $250,000 |
| Electronic Organ | ☑ | ◁▷ | 3200 | | $200,000 | $350,000 | $430,000 | $490,000 |
| Furnishings | ☑ | ◁▷ | 3200 | | $150,000 | $260,000 | $320,000 | $370,000 |
| Furnishings | ☑ | 2 ◁▷ | 3200 | | $150,000 | $260,000 | $320,000 | $370,000 |
| Furnishings | ☑ | 3 ◁▷ | 3200 | | $150,000 | $260,000 | $320,000 | $370,000 |
| Pipe Organ | ☑ | 3 ◁▷ | 3200 | | $1,000,000 | $1,730,000 | $2,130,000 | $2,470,000 |
| | | | | Total Equipment | $3,810,000 | $4,690,000 | $5,430,000 |
| Grounds Area | | Phase | SC | $/Sqft | | | | |
| Parking | | 1 ◁▷ | 3200 | 5 ◁▷ | | $970,000 | $2,090,000 | $3,020,000 |
| Parking | | 3 ◁▷ | 5400 | 5 ◁▷ | | $4,020,000 | $4,770,000 | $5,390,000 |
| Green Space | | 3 ◁▷ | 5400 | 3 ◁▷ | | $350,000 | $600,000 | $810,000 |
| Recreation | | 2 ◁▷ | 3200 | 3 ◁▷ | | $150,000 | $150,000 | $150,000 |
| Recreation | | 1 ◁▷ | 3200 | 3 ◁▷ | | $230,000 | $230,000 | $230,000 |
| | | 2 ◁▷ | 0 | 5 | | | | |
| Total Construction Cost | | | | | $31,362,120 | $46,721,420 | $59,530,020 |
| Site Work | ☑ | 1 ◁▷ | 3200 | | $0 | $0 | $0 | |
| Cost of Land | ☑ | 4 ◁▷ | 3200 | | $0 | $0 | $0 | |
| Cost of Land | ☑ | 3 ◁▷ | 3200 | | $0 | $0 | $0 | |
| Contingency | 15% | ◁▷ | | | $4,704,318 | $7,008,213 | $8,929,503 |
| Design Fees | 12.0% | ◁▷ | | | $3,763,454 | $5,606,570 | $7,143,602 |
| Total Project Cost | | | | | $39,829,892 | $59,336,203 | $75,603,125 |

FIG. 6D

Construction Phase Options

| | Phase 1 | Phase 2 | Phase 3 | Phase 4 |
|---|---|---|---|---|
| | 2006 | 2008 | 2011 | 2014 |
| Dollars | $18,037,000 | $9,224,595 | $16,892,436 | $2,976,856 |
| Fundraising & Permits | $395,250 | $408,467 | $298,199 | $390,515 |
| Contingency 15% | $2,705,550 | $1,383,689 | $2,533,865 | $446,528 |
| Design Fees 12% | $2,489,106 | $1,272,994 | $2,331,156 | $410,806 |
| Portables | $690,000 | $253,000 | $230,000 | $300,000 |
| Totals | $24,316,906 | $12,542,745 | $22,285,656 | $4,524,706 |
| Sq. Ft. | 108,700 | 88,150 | 64,750 | 18,285 |
| Project Cost/SqFt | $224 | $142 | $344 | $247 |
| Constructed $/SqFt | $165 | $106 | $144 | $161 |
| Main Sanctuary | ⊙ | ○ | ○ | ○ |
| Atrium | ⊙ | ○ | ⊙ | ○ |
| | ○ | ○ | ○ | ○ |
| | ○ | ⊙ | ⊙ | ○ |
| Childrens/Youth Education | ○ | ⊙ | ○ | ○ |
| | ○ | ⊙ | Chapel ⊙ | ○ |
| | ○ | ○ | ○ | ○ |
| | ○ | ○ | Adult Education ⊙ | ○ |
| | ○ | ○ | ○ | ○ |
| | ○ | Childrens/Youth Education ⊙ | ○ | ○ |
| | ○ | ○ | Childrens/Youth Education ⊙ | ○ |
| | ○ | ○ | ○ | ○ |
| | ○ | ○ | Administration/Staff ⊙ | ○ |
| | ○ | ○ | ○ | ⊙ |
| | ○ | ○ | Gymnasium ⊙ | ○ |

| Campaign Year | 2004 2006 | 2007 2008 | 2010 2011 | 2013 2014 |
|---|---|---|---|---|
| Project Phase Complete | | | | |
| Debt Service Capability | | | | |
| Project Description | Phase 1 | Phase 2 | Phase 3 | Phase 4 |
| Budgeted Costs | 24,316,906 | 12,542,745 | 22,285,656 | 4,524,706 |
| Other Funds | 700,000 | 0 | 0 | 0 |
| Expected Pledge Receipts | 12,925,440 | 18,910,800 | 12,285,594 | 21,668,472 |
| Required Borrowing | 10,691,466 | (6,368,055) | 10,000,062 | (17,143,766) |
| Financing Costs and Bank Charges | 534,573 | (318,403) | 500,003 | (857,188) |
| Debt Reduction | 1,802,471 | 1,064,164 | 2,757,306 | 3,695,664 |
| Debt Carryover | 11,413,000 | 20,836,568 | 13,085,946 | 20,828,706 |
| Maximum Total Debt | 20,836,568 | 13,085,946 | 20,828,706 | (867,912) |

Projected Campaign Collections:

| FYE | Total Budget | Pledge Multiple | Collection Rate | Estimated Collections |
|---|---|---|---|---|
| 2001 | 0 | | | |
| 2002 | 5,481,950 | 2.0 | 90% | $ 9,867,510 |
| 2003 | 6,069,000 | 2.0 | 90% | $ 10,924,200 |
| 2004 | 7,180,800 | 2.0 | 90% | $ 12,925,440 |
| 2005 | 8,272,200 | 2.0 | 90% | $ 14,889,960 |
| 2006 | 9,537,000 | 2.0 | 90% | $ 17,166,600 |
| 2007 | 10,506,000 | 2.0 | 90% | $ 18,910,800 |
| 2008 | 11,577,000 | 2.0 | 90% | $ 20,838,600 |
| 2009 | 13,576,200 | 1.3 | 85% | $ 15,001,701 |
| 2010 | 15,167,400 | 0.9 | 90% | $ 12,285,594 |
| 2011 | 16,942,200 | 2.1 | 90% | $ 32,020,758 |
| 2012 | 19,094,400 | 1.0 | 41% | $ 7,828,704 |
| 2013 | 20,063,400 | 1.2 | 90% | $ 21,668,472 |
| 2014 | 20,461,200 | 2.0 | 90% | $ 36,830,160 |
| 2015 | 20,869,200 | 2.0 | 90% | $ 37,564,560 |
| 2016 | 21,287,400 | 2.0 | 90% | $ 38,317,320 |
| 2017 | 21,715,800 | 2.0 | 90% | $ 39,088,440 |

| | Total Cost | Sq. Ft. |
|---|---|---|
| Phase 1 | $24,316,906 | 108700 |
| Phase 2 | $12,542,745 | 88150 |
| Phase 3 | $22,285,656 | 64750 |
| Phase 4 | $4,524,706 | 18285 |

| Campaign Years | |
|---|---|
| Phase 1 | 2004 |
| Phase 2 | 2007 |
| Phase 3 | 2010 |
| Phase 4 | 2013 |

1120
1118

SC1-Existing (2 Services) Att. 3780
☑ 1538  ▼ ~1110

SC2-Existing Room(3 Services) Att. 4857
☑ 1538  None ▼

SC3-3200 Seats(2 Services) Att. 5600
☑ 3200  Phase 1 ▼ ~1112

SC4-3200+1200 Seats(2 Services) Att. 7700
☑ 4400  Phase 2 ▼

SC5-3200+2200 Seats(2 Services) Att. 9450
☑ 5400  Phase 3 ▼

☐ Target Growth
☑ Reality Growth

| End of Construction | |
|---|---|
| Phase 1 | 2005.5 |
| Phase 2 | 2008 |
| Phase 3 | 2011 |
| Phase 4 | 2014 |
| No Phase | 2003.5 |

SYSTEM AND METHOD FOR GENERATING MULTI-PHASE CONSTRUCTION PLANS

TECHNICAL FIELD

This disclosure relates generally to planning systems and more particularly to a system and method for generating multi-phase construction plans.

BACKGROUND

Facilities in a complex, such as in a church or sports complex, are often built in stages. For example, construction of a new auditorium in a church may begin at a particular time. When construction of the auditorium nears completion, construction of new classrooms may begin. In this way, the church can stagger when money for each construction project is due. It is often a difficult and time-consuming process to plan and schedule multiple construction projects while taking into account the financing for the construction projects.

SUMMARY

This disclosure provides an improved system and method for generating multi-phase construction plans.

In one embodiment, a method includes identifying a plurality of facilities in a complex. Each facility is associated with a construction project. The method also includes determining a potential revenue associated with at least one of the facilities. The method further includes determining a cost associated with at least one of the facilities. In addition, the method includes generating a schedule of the construction projects using the identified potential revenue and the identified cost.

One or more technical features may be present according to various embodiments of this disclosure. Particular embodiments of this disclosure may exhibit none, some, or all of the following features depending on the implementation. For example, in one embodiment, a system for generating multi-phase construction plans is provided. In particular, the system can analyze various information and generate construction plans more quickly than conventional systems. As an example, the system can analyze the number of people attending a church, estimate the number of people who will attend the church in the future, and estimate the amount of donations that those people may give to the church. The system can then generate possible construction plans using the estimated collections by the church. This may allow the construction plans to be generated more quickly and easily.

Moreover, particular embodiments of the system allow a user to place constraints on various information used to generate the construction plans. For example, the user could specify that the church may not assume more than a specified amount of debt during the construction. The system then generates one or more construction plans, taking into account this constraint. This may allow the user to more easily set and change constraints and see how those constraints affect the construction plans.

This has outlined rather broadly several features of this disclosure so that those skilled in the art may better understand the detailed description that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for other words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure, reference is made to the following descriptions taken in conjunction with the accompanying drawings, in which:

FIGS. 6A through 6D illustrate an example screenshot used in a campus requirements and cost predictions process according to one embodiment of this disclosure;

FIG. 7 illustrates an example screenshot used in a phasing plan process according to one embodiment of this disclosure;

FIG. 9 illustrates an example screenshot used in a campaign projection process according to one embodiment of this disclosure;

FIG. 10 illustrates an example screenshot used in a debt services process according to one embodiment of this disclosure; and FIGS. 11A through 11E illustrate example screenshots used to summarize the results of the construction planning process according to one embodiment of this disclosure.

DETAILED DESCRIPTION OF THE INVENTION

Figure 1:
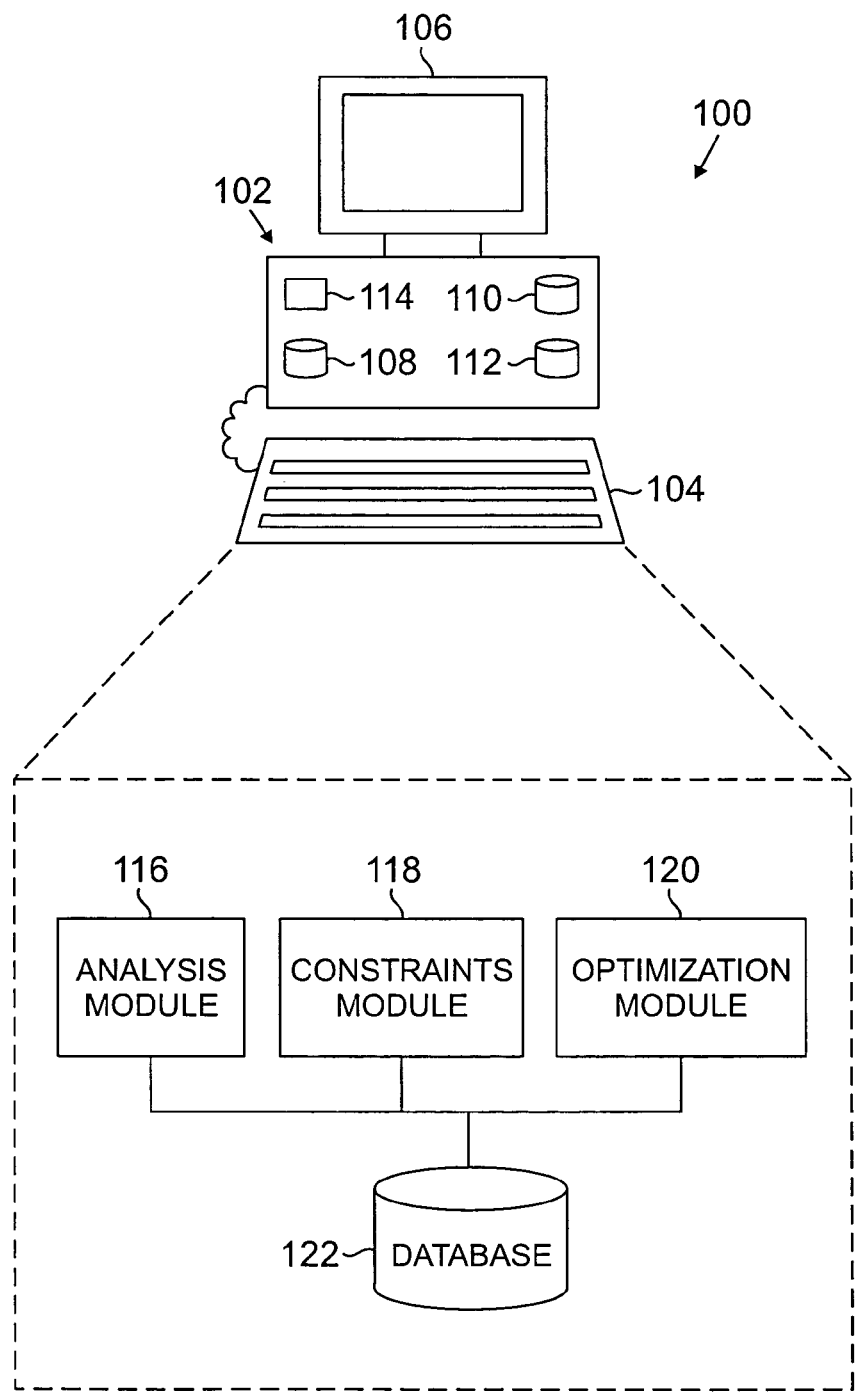
FIG. 1 illustrates an example system for construction planning according to one embodiment of this disclosure.

FIG. 1 illustrates an example system 100 for construction planning according to one embodiment of this disclosure. In the illustrated embodiment, the system 100 represents a host computer 102 executing software embodying the construction planning functionality. Other embodiments implementing the construction planning functionality could also be used.

In one aspect of operation, the host 102 generates at least one construction plan involving one or more facilities in a complex. In this specification, the term "facility" refers to all or a portion of a building, stadium, concert hall, amusement park, convention center, athletic center, transit system, or other structure or combination of structures. Also, in this specification, the term "complex" refers to a collection of one or more facilities. As an example, a church may represent a complex, and the auditorium, chapel, classrooms, gymnasium, and kitchen in the church may represent the facilities in the complex. The host 102 can receive information such as the facilities to be built or expanded, the money that is available or that will become available, and any other suitable information. The host 102 then analyzes the information and generates one or more possible construction plans or schedules. The host 102 could further allow the user to place constraints on various information used to generate the construction plans. In this way, construction plans may be generated more quickly and easily. This may also allow the user to see in real time how the constraints affect the construction plans. In this document, a "plan" or "schedule" may identify any suitable characteristic or characteristics of the construction of one or more facilities. As particular examples, the plan or schedule could identify when each facility is to be constructed, the phase in which each facility will be constructed, or the size of each facility.

The following description may describe the functionality of the system 100 in terms of construction planning for facilities in a church. The same or similar functionality of the system 100 could be used to plan construction of any other complex. Also, while the construction planning may be described as involving the construction of new facilities, the same or similar functionality could be used to schedule expansions to or improvements of existing facilities.

In the illustrated embodiment, the host 102 represents a desktop computer that includes an input device 104, an output device 106, random access memory (RAM) 108, read-only memory (ROM) 110, one or more data storage devices 112, and one or more processors 114. The input device 104 may, for example, include a keyboard, mouse, graphics tablet, touch screen, pressure-sensitive pad, joystick, light pen, microphone, or other suitable input device. The output device 106 may, for example, include a video display, a printer, a disk drive, a plotter, a speaker, or other suitable output device. The data storage device 112 may, for example, include a CD, DVD, hard drive, or other data storage and retrieval device.

Items within the dashed lines of FIG. 1 represent an example functional division within the host 102. As an example, this functional division could represent different software components executed by the host 102. As a particular example, the software components could represent macros executed using one or more Microsoft Excel spreadsheets. In this example embodiment, the host 102 includes an analysis module 116, a constraints module 118, an optimization module 120, and a database 122. Other embodiments of the host 102 could be used in the system 100.

The analysis module 116 analyzes various information provided to the host 102 and/or generated by the host 102. For example, the analysis module 116 could estimate the future growth of a church, estimate the amount of donations that the church may receive in the future, and calculate the cost to construct various facilities in the church. The analysis module 116 may use this information and generate possible construction plans for the facilities. The analysis module 116 may include any hardware, software, firmware, or combination thereof that is operable to analyze information related to one or more construction plans.

The constraints module 118 allows a user to set one or more constraints on the information used by the analysis module 116. For example, the user could identify a maximum amount of debt that a church is willing to endure during the construction of the church facilities. The constraints module 118 may include any hardware, software, firmware, or combination thereof that is operable to allow a user to set one or more constraints on parameters used to generate construction plans.

The optimization module 120 uses the constraints supplied to the constraints module 118 to generate one or more optimized construction plans. For example, the optimization module 120 could receive the information collected and/or generated by the analysis module 116 and provide a plan or plans that meet the constraints entered by the user. As a particular example, the optimization module 120 could generate or identify one or more construction plans in which the church does not assume more than a specified amount of debt. The optimization module 120 may include any hardware, software, firmware, or combination thereof that is operable to identify and/or generate one or more construction plans meeting one or more constraints.

The database 122 stores and facilitates retrieval of information used by modules 116-120. For example, the database 122 may store information identifying the demographics of the church's members, the estimated growth of the church, the estimated amount of donations that the church may receive in the future, and the estimated cost to construct various facilities in the church. The database 122 may include any hardware, software, firmware, or combination thereof operable to store and facilitate retrieval of information. The database 122 may also use any of a variety of data structures, arrangements, and compilations to store and facilitate retrieval of information.

Although FIG. 1 illustrates one example of a system 100 for construction planning, various changes may be made to FIG. 1. For example, while the system 100 is illustrated as using a desktop computer as the host 102, other computing devices can be used to implement the construction planning functionality. As a particular example, the system 100 could include a server implementing the construction planning functionality and a client that can access the server. In addition, the host 102 has been described as including various modules that represent software components executed by the host 102. The functions performed by the modules could be implemented in any hardware, software, firmware, or combination thereof, and various modules can be combined, added, or omitted as needed.

Figure 2:
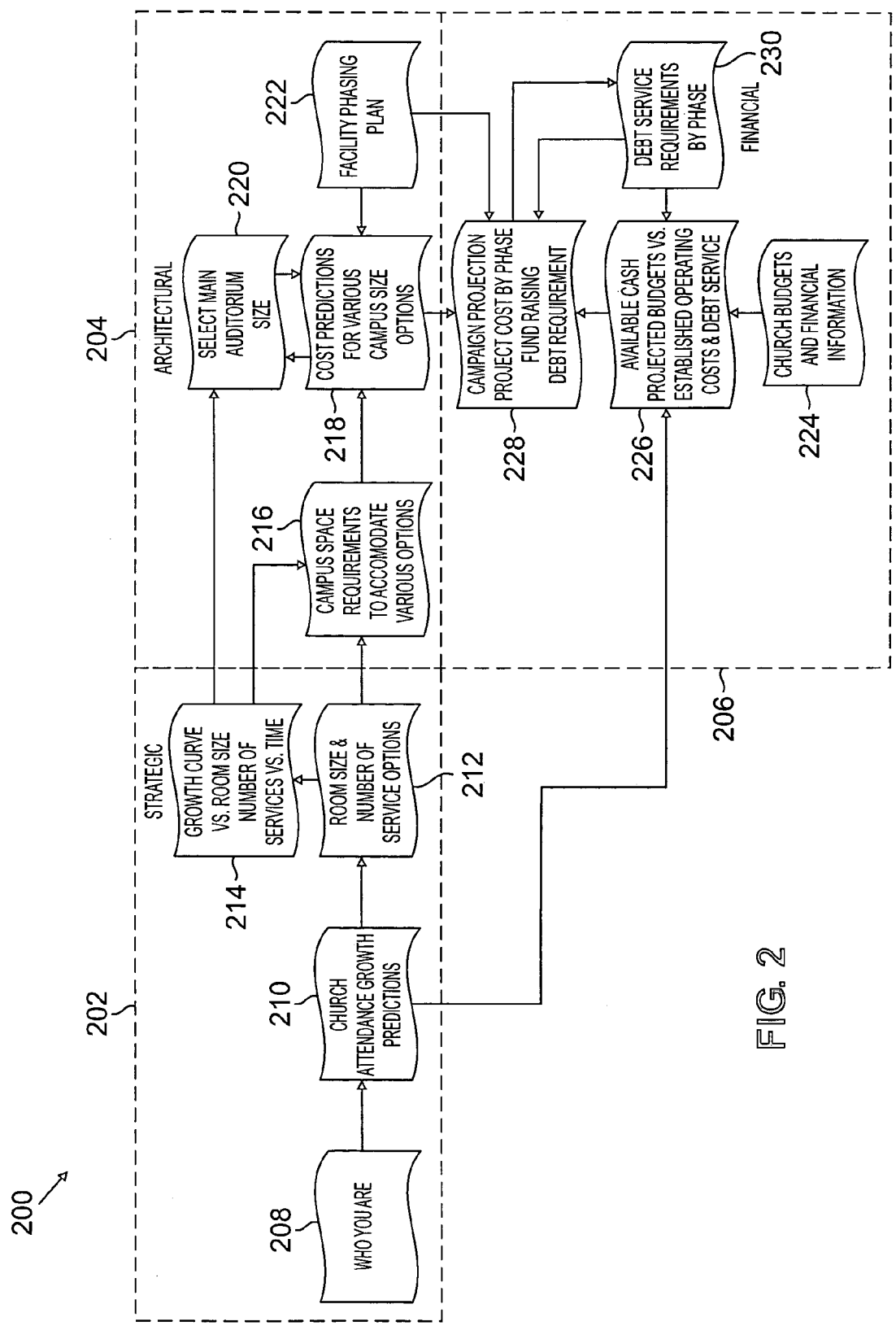
FIG. 2 illustrates an example construction planning process according to one embodiment of this disclosure.

FIG. 2 illustrates an example construction planning process 200 according to one embodiment of this disclosure. In particular, the process 200 illustrates the process used by the analysis module 116 in the host 102 of FIG. 1. The process 200 illustrated in FIG. 2 is for illustration only. Other processes could be used in the system 100.

The process 200 is divided into a strategic process 202, an architectural process 204, and a financial process 206. The strategic process 202 involves estimating the future development of the church. The architectural process 204 involves planning the construction of various facilities in the church. The financial process 206 involves identifying how the church may pay for the construction of the facilities.

In this example, the strategic process 202 includes a collection process 208 for collecting information about a church. This may include, for example, collecting information such as the demographics of the church's members.

The strategic process 202 also includes a prediction process 210. The prediction process 210 estimates the future growth of the church, such as by estimating the number of people who will attend or otherwise visit the church in the future. The prediction process 210 could involve one or multiple growth estimates. For example, the user of the host 102 could enter information identifying the potential growth of the church. The host 102 could also receive information identifying the past growth rates of the church and estimate the future growth of the church. Any other or additional technique or techniques for estimating growth could also be used in the host 102.

The strategic process 202 further includes a room size and services process 212. The room size and services process 212 allows the user to identify the current size of the church's auditorium and the number of church services occurring in the current auditorium. The room size and services process 212 also allows the user to identify possible sizes of future auditoriums and the number of services that might occur in those future auditoriums.

In addition, the strategic process 202 includes an analysis process 214. The analysis process 214 analyzes the predicted growth of the church and the size of the current auditoriums and possible future auditoriums. The analysis process 214 then estimates when the current and future auditoriums may run out of space. In this way, the analysis process 214 identifies when larger facilities may be needed in the church.

The architectural process 204 includes a campus requirements process 216. The campus requirements process 216 allows a user to provide a list of the various facilities in a church to be constructed. The campus requirements process 216 could also allow the user to specify the size of the facilities, such as by identifying the number of square feet needed per person in each facility.

The architectural process 204 also includes a cost predictions process 218. The cost predictions process 218 calculates the estimated cost of each facility. For example, the user may identify the cost per square foot of each facility. The host 102 may use the number of people estimated to attend the church, the number of square feet needed per person, and the cost per square foot to estimate the cost of each facility.

The architectural process 204 further includes an auditorium selection process 220. The auditorium selection process 220 allows the user to select the size of the auditorium to be constructed. For example, the user can review the various costs associated with different sized auditoriums and select one of the auditoriums based on the cost and other factors.

In addition, the architectural process 204 includes a phasing plan process 222. The phasing plan process 222 allows a user to specify when construction of different facilities is to be completed. For example, the construction of the facilities may be divided into multiple phases, and the phasing plan process 222 may allow the user to identify the phase during which the construction of each facility will occur. Using the identified phases, the phasing plan process 222 could also determine the total cost of the construction by phase.

The financial process 206 includes a collection process 224. The collection process 224 includes collecting information about the financial characteristics of the church. For example, the collection process 224 may include collecting information identifying the current budget of the church. The collection process 224 may also include collecting information identifying the donation habits of the church members.

The financial process 206 also includes a campaign projection process 228. The campaign projection process 228 estimates the amount of money that may be donated to a church as the attendance at the church increases in the future. The projection process 228 may also identify how the donations to the church may pay for the different phases of the construction. The projection process 228 may further identify the amount of debt that the church may experience during the construction process.

The financial process 206 further includes an operating expenses process 226. The operating expenses process 226 estimates the church's ministry and other daily expenses. The operating expenses process 226 also determines how the cost of the construction affects the church's ministry and other daily expenses. The operating expenses process 226 may further identify the amount of cash that may be available for the church. In this way, the user can understand how the cost of the construction might affect the church's other activities.

In addition, the financial process 206 includes a debt services process 230. The debt services process 230 may generate a debt service schedule showing how any debt incurred by the church would be repaid.

Each of the processes in FIG. 2 could be implemented in any hardware, software, firmware, or combination thereof. For example, each process could represent a function or functions performed by a software module executed by the host 102 of FIG. 1. Also, while various processes have been described as requiring user input, these processes could retrieve information in any other suitable manner. For example, the processes could analyze information previously provided to and stored in the database 122.

Figure 3A:
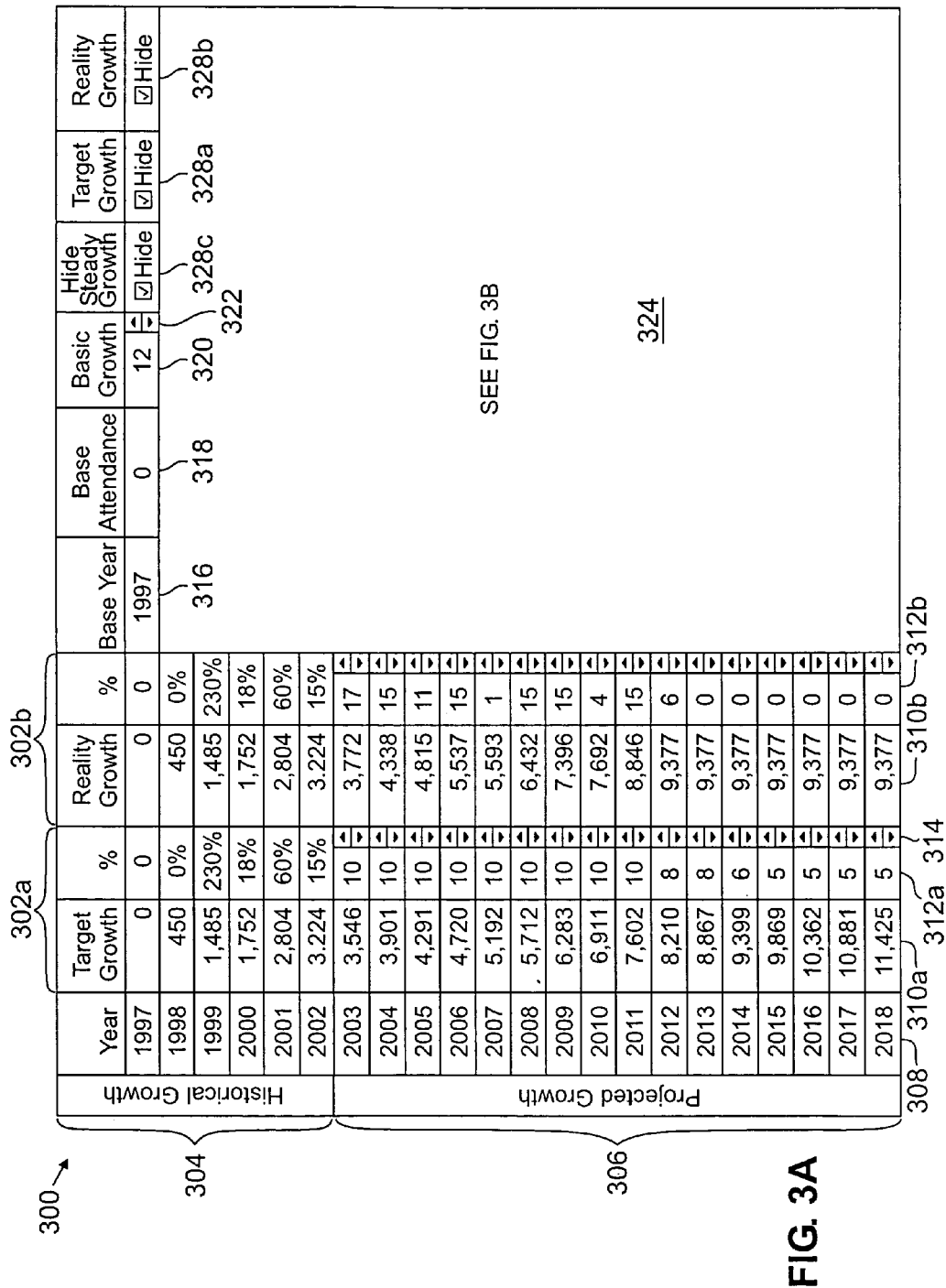
FIGS. 3A and 3B illustrate an example screenshot used in an attendance prediction process according to one embodiment of this disclosure.
Figure 3B:
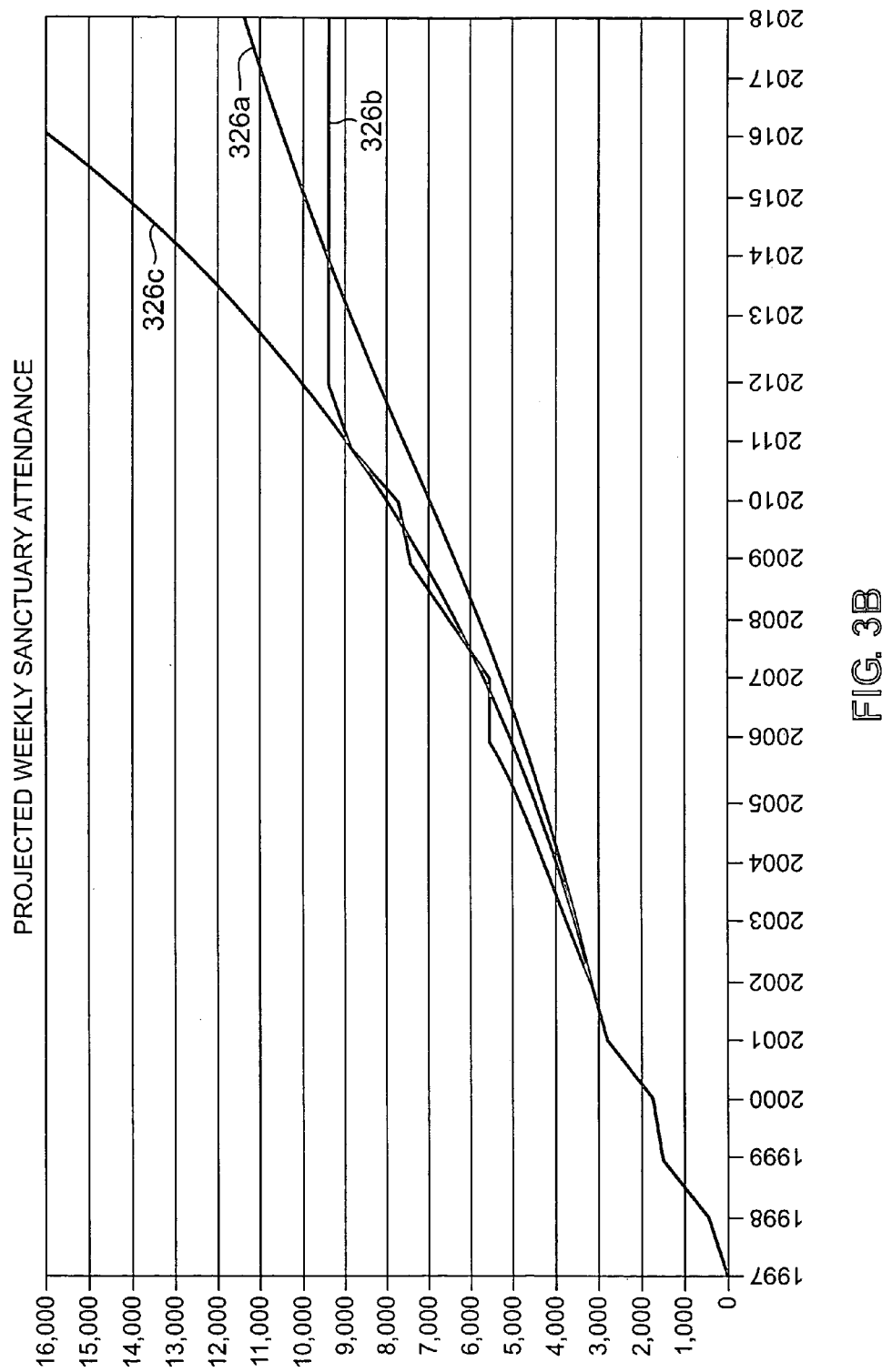

FIGS. 3A and 3B illustrate an example screenshot 300 used in an attendance prediction process 210 according to one embodiment of this disclosure. The screenshot 300 illustrated in FIGS. 3A and 3B is for illustration only. Other screenshots could be used in the system 100 without departing from the scope of this disclosure.

In the illustrated example, the screenshot 300 includes one or more growth options 302a-302b. The growth options 302 allow a user to enter information identifying how a church might experience future growth. In this example, each growth option 302 includes a historical growth portion 304 and a projected growth portion 306. The historical growth portion 304 identifies the previous growth experienced by the church. The projected growth portion 306 identifies the predicted future growth that might be experienced by the church.

The historical growth and projected growth can be controlled by the user. As shown in FIG. 3A, the historical growth and projected growth are divided into years 308. For each year 308, the attendance 310 at the church is identified. The increase in the attendance 310 for one year 308 over the previous year 308 is identified as a growth percentage 312. The user can enter values for the attendance 310 and growth percentage 312, and the user could use buttons 314 to control the growth percentage 312. In other embodiments, the host 102 could generate values for the attendance 310 and growth percentage 312 automatically, such as by using the historical growth to predict the future growth.

In the illustrated example, there are two growth options 302. One growth option 302a represents the desired growth of the church, while the other growth option 302b represents the likely growth of the church. The growth options 302 represent growth starting at a given base year 316 and a given base attendance 318. These growth options 302 are for illustration only. Other or additional growth options could be used in the system 100.

Instead of or in addition to the growth options 302, the user can specify a constant growth percentage. The user can specify that, starting in the current year 308, the church will grow at a constant percentage 320 each year. The user can enter a value for the constant percentage 320 or use buttons 322.

The prediction process 210 can analyze the various information and chart the projected growth of the church in a graph 324. The graph 324, which is shown in FIG. 3B, includes three lines 326a-326c. Line 326a represents the growth projected by the growth option 302a, line 326b represents the growth projected by the growth option 302b, and line 326c represents the growth projected by the constant growth percentage 320. In this way, a visual representation of the various growth possibilities associated with the church can be provided to the user.

In addition, the user may remove one or more lines 326 from the graph 324 using controls 328a-328c. Each control 328 is associated with one of the lines 326 in the graph 324 and controls whether the associated line 326 is hidden in the graph 324.

Although FIGS. 3A and 3B illustrate one example of a screenshot 300 used in the prediction process 210, various changes may be made to FIGS. 3A and 3B. For example, any number of growth options 302 could be used. Also, the layout and design of the screenshot 300 are for illustration only. Further, the prediction process 210 could include algorithms for automatically predicting future growth based on historical growth. In this way, the user may not be required to provide the information to the host 102.

Figure 4:
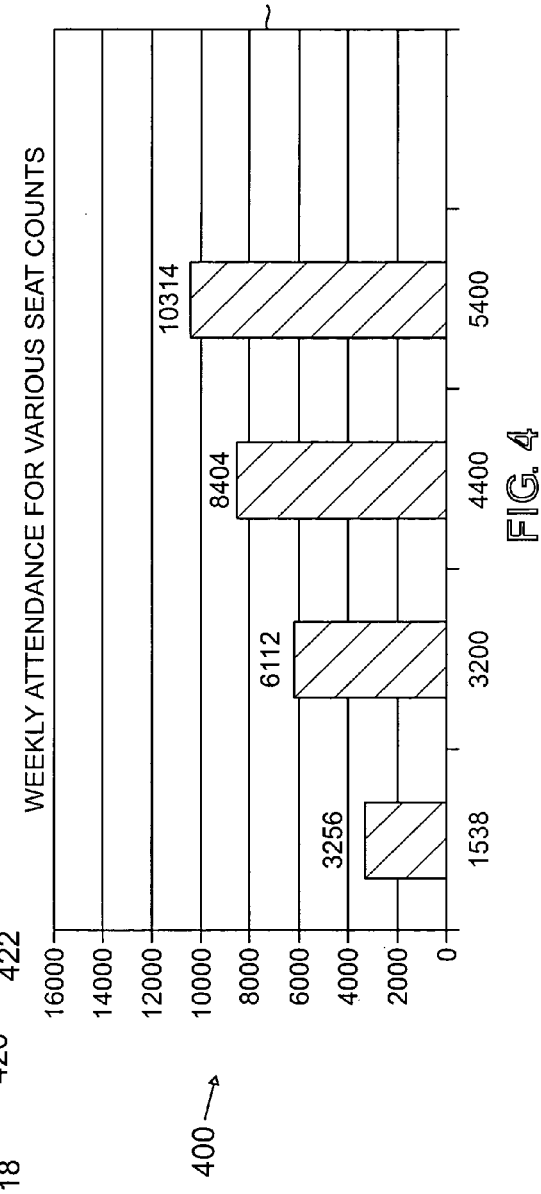
FIG. 4 illustrates an example screenshot used in a room size and services process according to one embodiment of this disclosure.

FIG. 4 illustrates an example screenshot 400 used in a room size and services process 212 according to one embodiment of this disclosure. The screenshot 400 illustrated in FIG. 4 is for illustration only. Other screenshots could be used in the system 100 without departing from the scope of this disclosure.

In the illustrated example, the screenshot 400 includes an activities portion 402 and a totals portion 404. The activities portion 402 contains information about various activities that occur in the church. In this example, the activities portion 402 contains information about church services that occur. As shown in FIG. 4, the activities portion 402 includes different entries for each service offered in the church. In particular, the church has two services in the church's main auditorium, and an overflow room is provided for each service.

Each entry in the activities portion 402 identifies the typical capacity 404 of the auditorium or overflow room that is normally occupied during a church service. An overflow column 410 identifies the typical number of seats that are occupied in the overflow room during the church services. A current seat column 412 identifies the total number of seats currently used in the auditorium or overflow room during the church services. Potential seat columns 414a-414c identify the total number of seats that could be occupied in a future auditorium or overflow room during church services. Check boxes 416 allow the user to define whether the overflow room would be made available during the church services.

The totals portion 404 identifies the average capacity 418 of the auditorium that is currently used during the church services. The totals portion 404 also identifies the total weekly attendance 420 in the church auditorium and the overflow room. The totals portion 404 further includes the maximum weekly attendance 422 that could be accommodated in the auditorium.

In addition, a graph 424 may be provided to the user that plots the various total weekly attendances 420 against the seat counts 412, 414. In this way, the user can see what the average weekly attendance could be given the various sizes of auditoriums that could be built.

The screenshot 400 illustrated in FIG. 4 represents only one of multiple screenshots that could be generated and used by the host 102. For example, the screenshot 400 in FIG. 4 illustrates the number of seats that could be available to church members during two church services. A similar screenshot can be used to show the user how the seat count would vary if three services were performed in the church auditorium.

Although FIG. 4 illustrates one example of a screenshot 400 used in the room size and services process 212, various changes may be made to FIG. 4. For example, any number of potential seat counts 414 could be used. Also, the layout and design of FIG. 4 are for illustration only.

Figure 5:
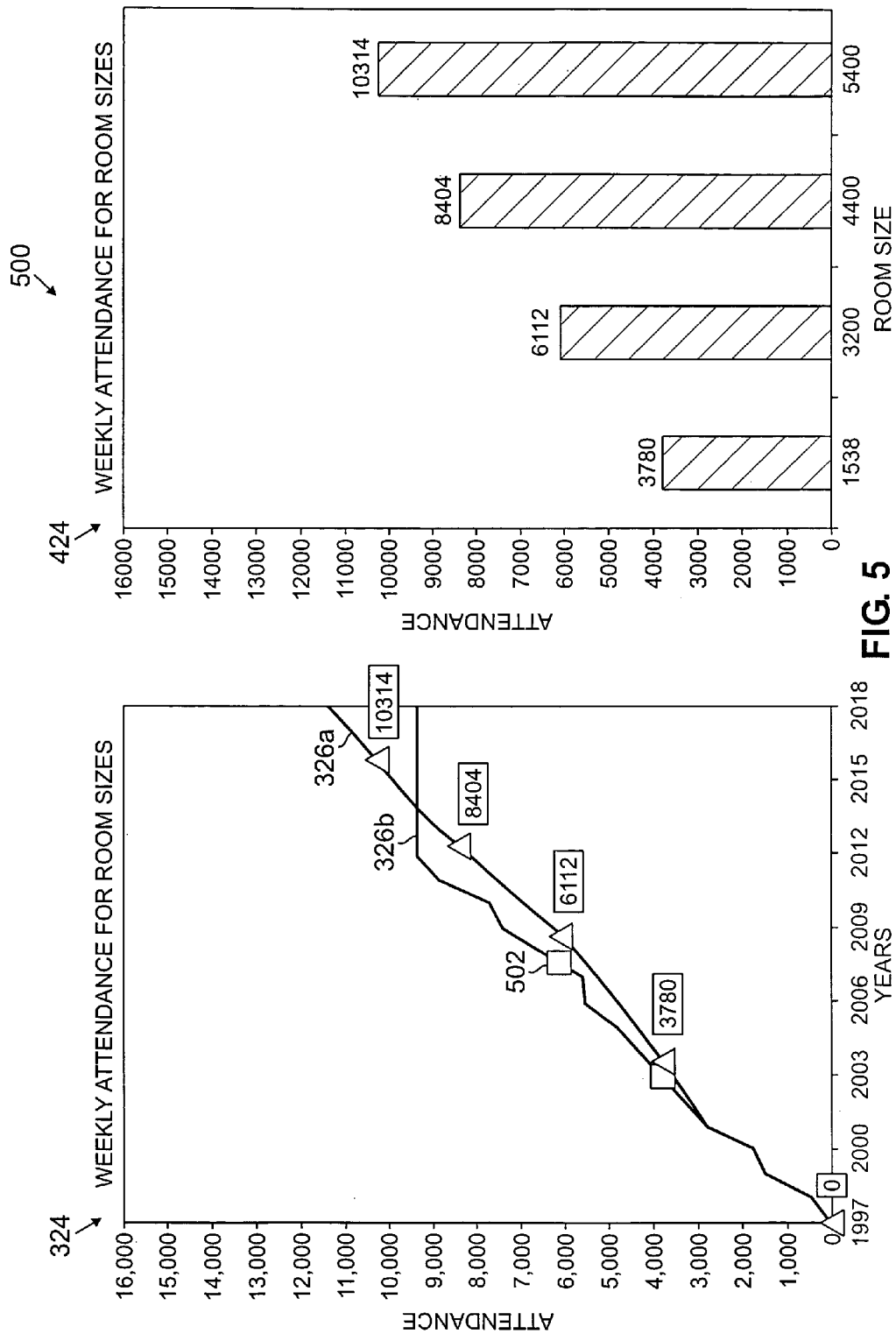
FIG. 5 illustrates an example screenshot used in an attendance analysis process according to one embodiment of this disclosure.

FIG. 5 is a block diagram illustrating an example screenshot 500 used in an analysis process 214 according to one embodiment of this disclosure. The screenshot 500 illustrated in FIG. 5 is for illustration only. Other screenshots could be used in the system 100 without departing from the scope of this disclosure.

In the illustrated example, the screenshot 500 includes the graph 324 from the prediction process 210 and the graph 424 from the room size and services process 212. In this example, the user can see how auditoriums of various sizes can accommodate the predicted growth of the church. For example, various indicators 502 on the lines 326a-326b indicate when the predicted attendance at the church matches the expected attendance based on the size of the church's auditorium. In other words, the indicators 502 identify when the church may need a larger auditorium.

Although FIG. 5 illustrates one example of a screenshot 500 used in an analysis process 214, various changes may be made to FIG. 5. For example, the layout and design of screenshot 500 are for illustration only.

FIGS. 6A through 6D illustrate an example screenshot 600 used in a campus requirements and cost predictions process 216, 218 according to one embodiment of this disclosure. The screenshot 600 illustrated in FIGS. 6A through 6D is for illustration only. Other screenshots could be used in the system 100 without departing from the scope of this disclosure.

In the illustrated example, the screenshot 600 includes an attendance portion 602. The attendance portion 602 includes an entry 604 identifying the largest attendance that may occur given various sizes of the church auditorium. In this case, the largest attendance identified by the entry 604 represents the attendance at the second service shown in FIG. 4. The attendance portion 602 also includes an adult education attendance entry 606 and a children attendance entry 608. These entries 606 and 608 identify the number of adults and children, respectively, that may attend other programs in the church. The host 102 may use demographics of the church and percentages 610 to identify the number of adults and children that may attend the other church programs. In addition, the attendance portion 602 includes a total attendance entry 612, which identifies the total number of people attending the various activities in the different sized churches.

The screenshot 600 also includes a parking requirements portion 614. The parking requirements portion 614 identifies the amount of parking that may be needed for the different sized churches. In FIG. 6A, the parking requirements portion 614 includes different estimates 616a-616b of the number of parking spaces that might be needed. One estimate 616a is based on the maximum size of the church auditorium, and the other estimate 616b is based on the total number of people attending the church's activities. The user can adjust the number of people per car 618 to change the estimate of the parking requirements.

The screenshot 600 further includes a facilities definition portion 620. Each entry 622 in the facilities definition portion 620 allows the user to identify one of the facilities in the church to be constructed. For example, the facilities can be predefined, and a checkbox 624 allows the user to identify which facilities are to be constructed. For each facility, the user can also specify the floor 626 of the church in which the facility is to be built.

The user could further identify a grossing factor 628. The grossing factor 628 allows the user to take into account the fact that space is needed to accommodate the use, circulation, or movement of people or equipment in the church. As particular examples, the church may include aisles, doors, stairways, and other structures to allow people to move inside the church. Also, equipment can be stored in and move through storage closets, janitorial corridors, electrical rooms, or other structures. The grossing factor 628 allows the user to specify how much extra space may be needed for these various structures.

In addition, the user can specify the number of people per room 630 and the number of square feet per person 632. The square feet per person value 632 could also be a set size, such as when a gymnasium should be 9,500 square feet no matter how large the church is.

Using this information, the host 102 can determine a size 634 for each facility. The size 634 of some facilities may vary depending on the size of the church auditorium, while the size 634 of other facilities may be constant. In addition, a facility could be used for multiple purposes, and the amount of space that can be reused for other purposes can be identified as reusable space 636.

As shown in FIG. 6B, the screenshot 600 also includes a grounds definition portion 638. The grounds definition portion 638 allows the user to identify areas associated with the facilities. For example, the user could identify a grossing factor 628 and number of square feet 632 for a parking lot. The user could also identify areas used for recreation and a green space. A total area section 640 sums the area needed for the various facilities and grounds. For example, the total area section 640 may identify the total number of square feet for the buildings and the total acreage needed for the facilities and grounds of the church.

As shown in FIG. 6C, the screenshot 600 further includes a costs portion 642. Costs portion 642 includes an entry 644 for each facility in the church. Each entry 644 includes a phase 646 identifying the phase of a multi-phase construction plan in which the facility may be built. Each entry 644 also includes a seat count 648 and a cost per square foot 650. The seat counts 648 identify the various sizes of auditoriums that could be built. By providing different costs per square foot 650 for different seat counts 648, the user can see how the cost of a facility may vary based on the seat count. Also, the user could indicate that multiple sizes of the same type of facility could be built, such as when multiple auditoriums of different sizes would be built. The host 102 can use the cost per square foot 650 and the sizes 634 of the facilities to identify an estimated cost 652 of each facility. The costs 652 of all facilities can be summed and shown in entry 654. Similarly, the host 102 can identify the cost of specialized equipment, such as audio and video equipment, and the cost of the areas associated with the facilities, such as the parking lot and green space.

As shown in FIG. 6D, the screenshot 600 can identify the total construction cost 656 for each of the different sized churches. The host 102 could also identify various expenses 658, such as the cost of land. The host 102 could further identify contingency expenses 660 to cover possible cost overruns and unexpected expenses and design fees 662 needed to design the new facilities. Finally, the host 102 can identify the total costs 664 to complete the various construction projects.

Although FIGS. 6A through 6D illustrate one example of a screenshot 600 used in a campus requirements and cost predictions process 216, 218, various changes may be made to FIGS. 6A through 6D. For example, any other or additional information could be collected and/or generated by the host 102. Also, the layout and design of the screenshot 600 are for illustration only.

FIG. 7 illustrates an example screenshot 700 used in a phasing plan process 222 according to one embodiment of this disclosure. The screenshot 700 illustrated in FIG. 7 is for illustration only. Other screenshots could be used in the system 100 without departing from the scope of this disclosure.

In the illustrated example, the screenshot 700 includes a phasing schedule portion 702, which identifies when the various phases of the construction plan may be complete. The screenshot also includes a financial portion 704, which identifies various financial information about the construction plan. In particular, the financial portion 704 may identify the cost and other expenses associated with each phase of the construction.

The screenshot 700 further includes a phase selection portion 706. The phase selection portion 706 allows the user to select the phase in which a particular facility may be constructed. In the illustrated example, each facility has a radio button 708 associated with each phase. The user can select the radio button 708 associated with a particular phase to schedule construction of a facility during that phase. As the user changes the phases in which the facilities would be built, the financial information contained in the financial portion 704 may also change. In this way, the user can identify how changes in the construction schedule affect the church monetarily.

Although FIG. 7 illustrates one example of a screenshot 700 used in a phasing plan process 222, various changes may be made to FIG. 7. For example, any other or additional facilities could be identified in the screenshot 700. Also, the layout and design of the screenshot 700 are for illustration only.

Figure 8:
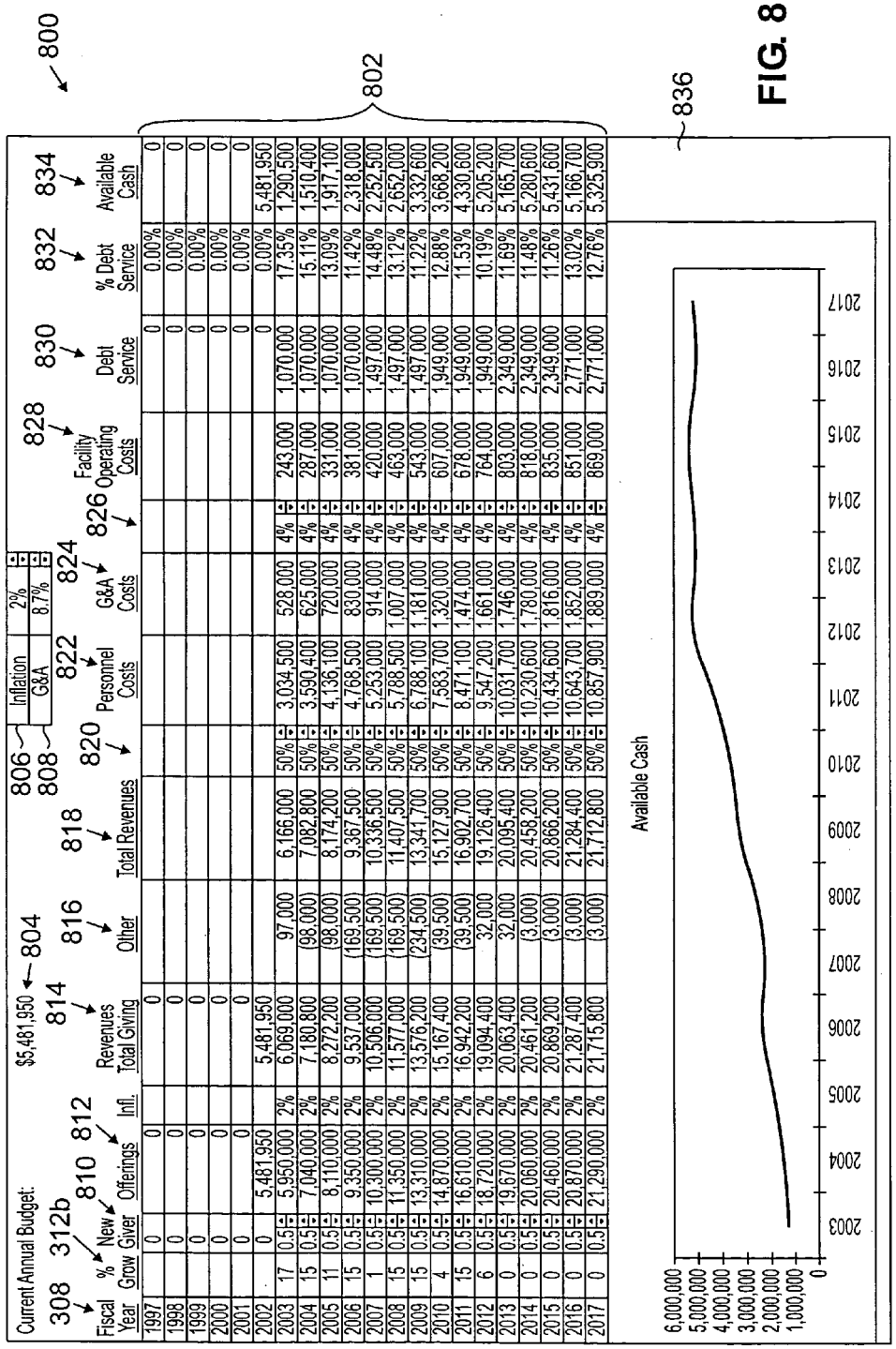
FIG. 8 illustrates an example screenshot used in an operating expenses process according to one embodiment of this disclosure.

FIG. 8 illustrates an example screenshot 800 used in an operating expenses process 226 according to one embodiment of this disclosure. The screenshot 800 illustrated in FIG. 8 is for illustration only. Other screenshots could be used in the system 100 without departing from the scope of this disclosure.

In the illustrated example, the screenshot 800 includes an operating budget portion 802. The operating budget portion 802 identifies the church's current annual budget 804, the rate of inflation 806, and the percentage 808 of the church's budget required for general and administrative (G&A) expenses.

In addition to this information, for each year 308 the operating budget portion 802 identifies the growth percentage 312 in the membership of the church. The operating budget portion 802 also identifies the rate 810 at which new church members donate to the church. For example, new members may tend to donate less money to the church than people who have been members for longer periods of time. The rate 810 allows the user to specify how much new members donate compared to older members. In this example, the user has specified that new members give half of what older members donate.

The host 102 can use this information to estimate the amount of donations 812 that may be given to the church during future years 308. For example, the host 102 may use the previous year's donations 810, the predicted growth in the church, and the rate 810 at which the new members donate to estimate the donations 812 for a given year 308. The host 102 may then factor in inflation 806 to estimate the total adjusted donations 814 that the church may receive. Other revenue sources 816 may be combined with the adjusted donations 814 to calculate the total revenue 818 available to the church.

The host 102 can then calculate the various operating costs of the church. For example, the user can identify the percentage 820 of the total revenue that is used for personnel costs, and the host 102 can calculate the personnel costs 822. The host 102 can also use the total adjusted donations 814 and the percentage 808 to calculate the general and administrative expenses 824 of the church. The user can further identify a percentage 826 of the total adjusted donations 814 that are used to maintain the church's facilities, and the host 102 can calculate the facility operating costs 828. Further, the host 102 can identify the amount of debt 830 paid off each year 308 and the percentage 832 of the total revenue 818 used to pay off the debt. Finally, the host 102 can identify the amount of available cash 834 that would be available for use each year by the church.

The screenshot 800 also includes a graph 836. The graph 836 provides a visual representation of the amount of available cash 834 that may be available to the church of the years 308.

Although FIG. 8 illustrates one example of a screenshot 800 used in an operating expenses process 226, various changes may be made to FIG. 8. For example, any other or additional information could be contained in the screenshot 800. Also, the layout and design of the screenshot 800 are for illustration only.

FIG. 9 illustrates an example screenshot 900 used in a campaign projection process 228 according to one embodiment of this disclosure. The screenshot 900 illustrated in FIG. 9 is for illustration only. Other screenshots could be used in the system 100 without departing from the scope of this disclosure.

In the illustrated example, the screenshot 900 includes a campaign identification portion 902, which identifies the various phases of the construction, the year of the fund-raising campaign for each phase, and the year when each phase is should be complete. The screenshot 900 also includes a debt service portion 904, which identifies the costs needed for the construction phases, the expected donations that the church may receive, and the amount of borrowing and debt that the church may expect to pay for each construction phase.

A detailed campaign collections portion 906 identifies the various revenues that may be collected by the church during the fund-raising campaigns. For example, the detailed campaign collections portion 906 may identify the various fiscal years 308, along with the total adjusted donations 814 for each year 308. In addition, the detailed campaign collections portion 906 may identify pledge multiples 908 and collection percentages 910, which are used to identify the amount of money that the church may collect. For example, church members often make pledges to donate money to the church. A pledge multiple 908 identifies a multiple of the total adjusted donations 814 that the church members may actually donate during fund-raising campaigns. For example, a pledge multiple 908 of "2" indicates that the church members may donate twice the total adjusted donations 814 of the church. Also, a collection percentage 910 identifies the percentage of pledged donations that church members may actually donate. This allows the host 102 to take into account that some members who pledge money may not actually give the money to the church. Using these values, the host 102 may calculate the total collections 912 that could be collected during the years 308.

Although FIG. 9 illustrates one example of a screenshot 900 used in a campaign projection process 228, various changes may be made to FIG. 8. For example, any other or additional information could be included in the screenshot 900. Also, the layout and design of the screenshot 900 are for illustration only.

Figure 10:
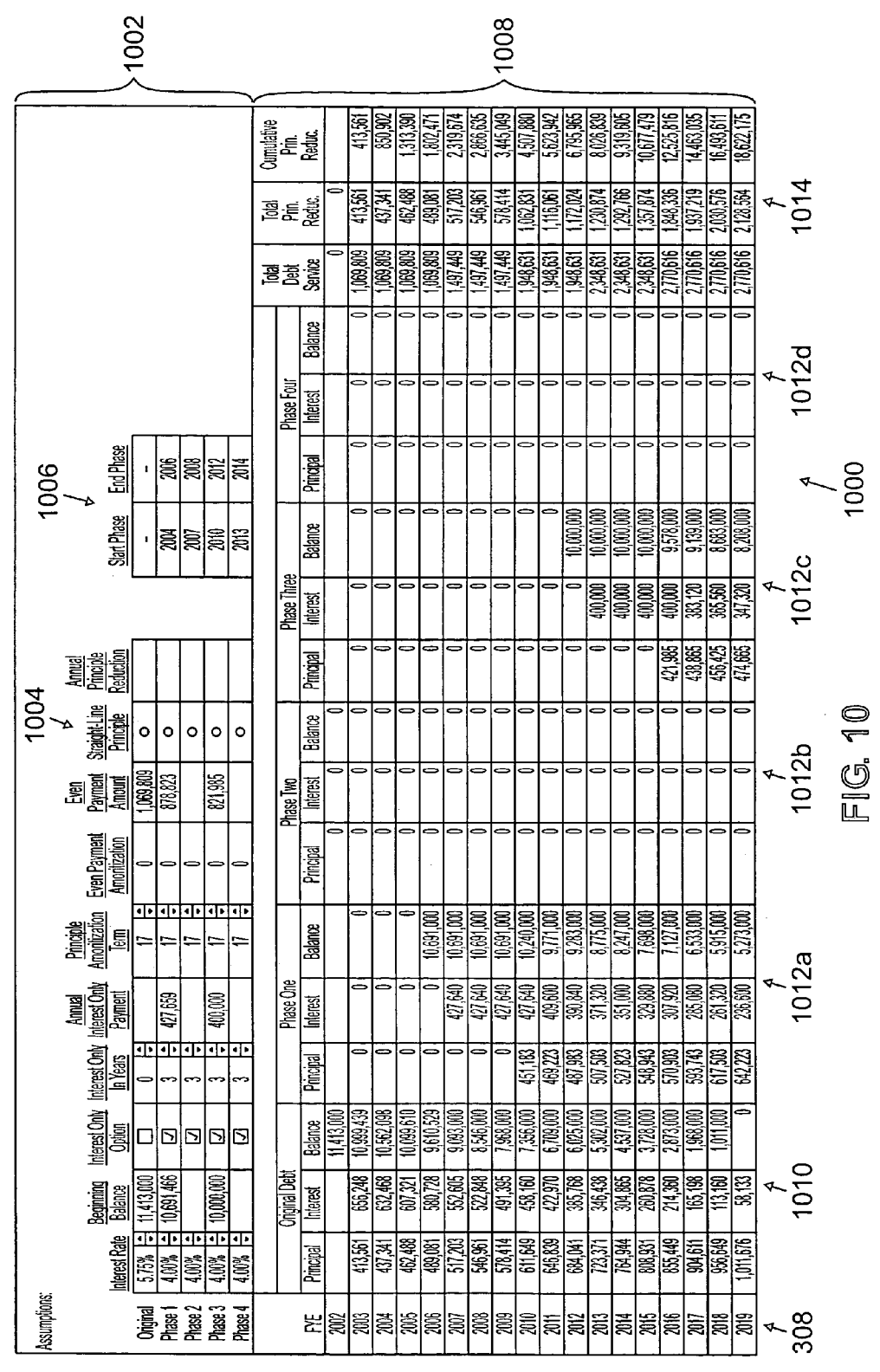

FIG. 10 illustrates an example screenshot 1000 used in a debt services process 230 according to one embodiment of this disclosure. The screenshot 1000 illustrated in FIG. 10 is for illustration only. Other screenshots could be used in the system 100 without departing from the scope of this disclosure.

In the illustrated example, the screenshot 1000 includes a financing options portion 1002. The financing options portion 1002 allows the user to enter financing information 1004 about financing that could be used by the church to pay for the construction. The financing options portion 1002 also includes a phase schedule 1006 that identifies when the construction phases occur.

The screenshot 1000 also includes a debt schedule 1008. The debt schedule 1008 identifies how the church may pay off its debt incurred during the construction projects. For example, the church's current original debt 1010 would continue to be paid off during the construction. In addition to the original debt 1010, the debt 1012a-1012d incurred during each construction phase would also be paid off by the church over time. The total amounts 1014 paid in interest and to reduce the principal per year 308 are also identified in the debt schedule 1008.

Although FIG. 10 illustrates one example of a screenshot 1000 used in a debt services process 230, various changes may be made to FIG. 10. For example, any other or additional information could be included in the screenshot 1000. Also, the layout and design of the screenshot 1000 are for illustration only.

FIGS. 11A through 11E illustrate example screenshots 1100a, 1100b used to summarize the results of the construction planning process according to one embodiment of this disclosure. The screenshots 1100 illustrated in FIGS. 11A through 11E are for illustration only. Other screenshots could be used in the system 100 without departing from the scope of this disclosure.

Figure 11A:
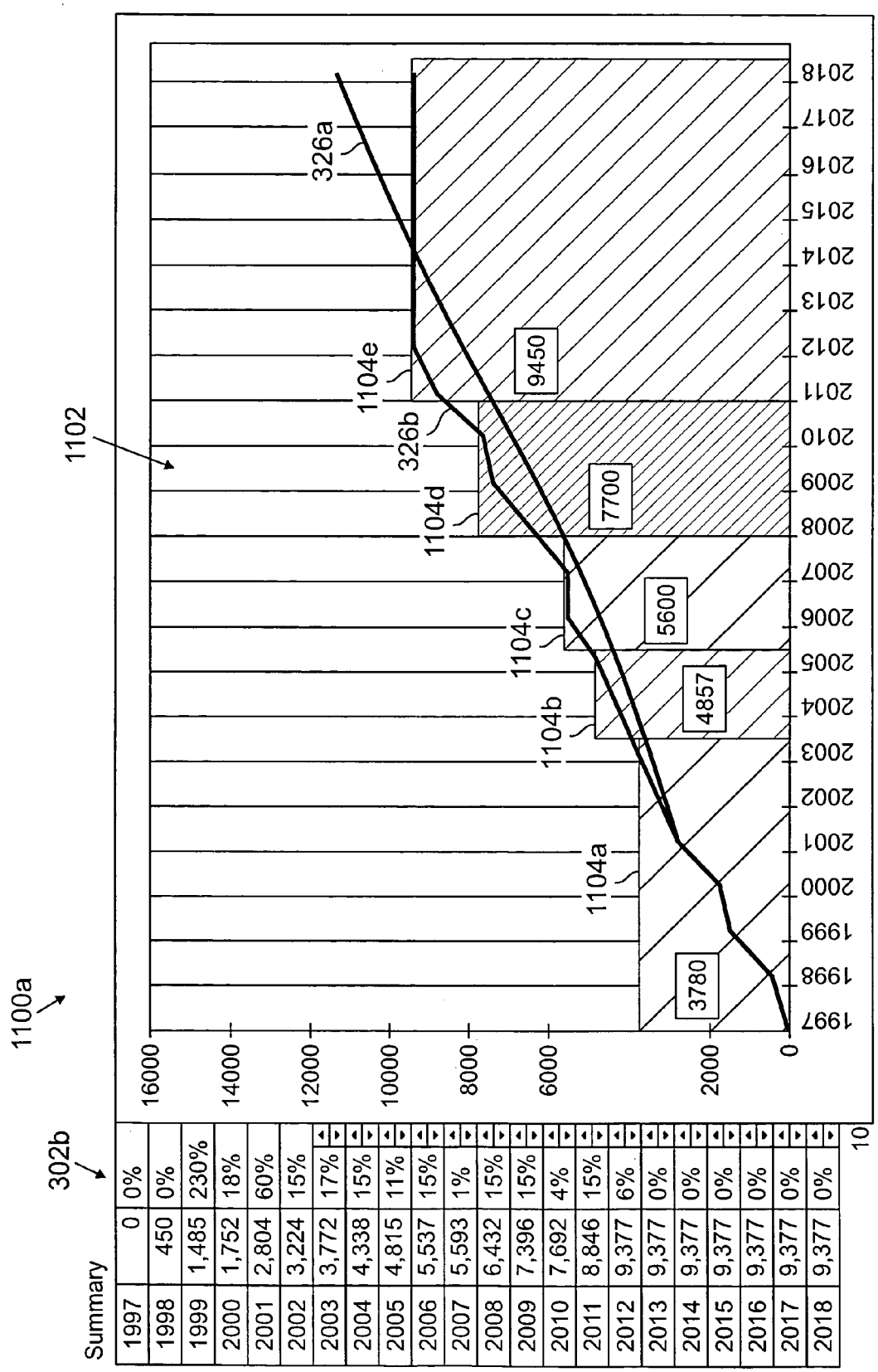

In FIG. 11A, a screenshot 1100a includes the realistic growth option 302b. The screenshot 1100a also includes a graph 1102, which illustrates how the growth of the church may be accommodated in current and future church auditoriums. For example, lines 326 represent the possible growth of the church. Blocks 1104a-1104e represent the maximum attendance that may be achieved given a particular auditorium size and number of services. For example, blocks 1104a and 1104b represent the maximum number of people who might attend church services in the church's current auditorium when two services and three services, respectively, are held. Block 1104c represents the maximum number of people who might attend two church services in a 3,200 seat auditorium. Blocks 1104d and 1104e represent the maximum number of people who might attend church services in a 3,200 seat auditorium that has been expanded by 1,200 seats and 2,200 seats, respectively. Using this graph 1102, the user can see how the projected attendance of the church can be accommodated in the facilities to be constructed.

In FIG. 11B, controls 1106 may be used by the user to change or otherwise control the blocks 1104 in the graph 1102. For example, checkboxes 1108 allow the user to control which blocks 1104 are displayed in the graph 1102. Pull-down menus 1110 allow the user to change the size of the current auditorium and future auditoriums. Pull-down menus 1112 allow the user to change the phase during which the various auditoriums may be built or expanded. In addition, checkboxes 1114 allow the user to control which lines 326 appear in the graph 1102. Slide bars 1116 allow the user to change the time when each construction phase should be completed. Finally, buttons 1118 allow the user to control when the fund-raising campaigns may occur. Each of these can affect when construction of the various auditoriums can occur. For example, construction may need to be postponed if the fund-raising campaign occurs later in time. Changes made using these controls 1106 may be propagated back through the previous screenshots.

The screenshot 1100a further includes a summary 1120. The summary 1120 identifies the total cost of the construction per phase and the size of the construction per phase.

Figure 11C:
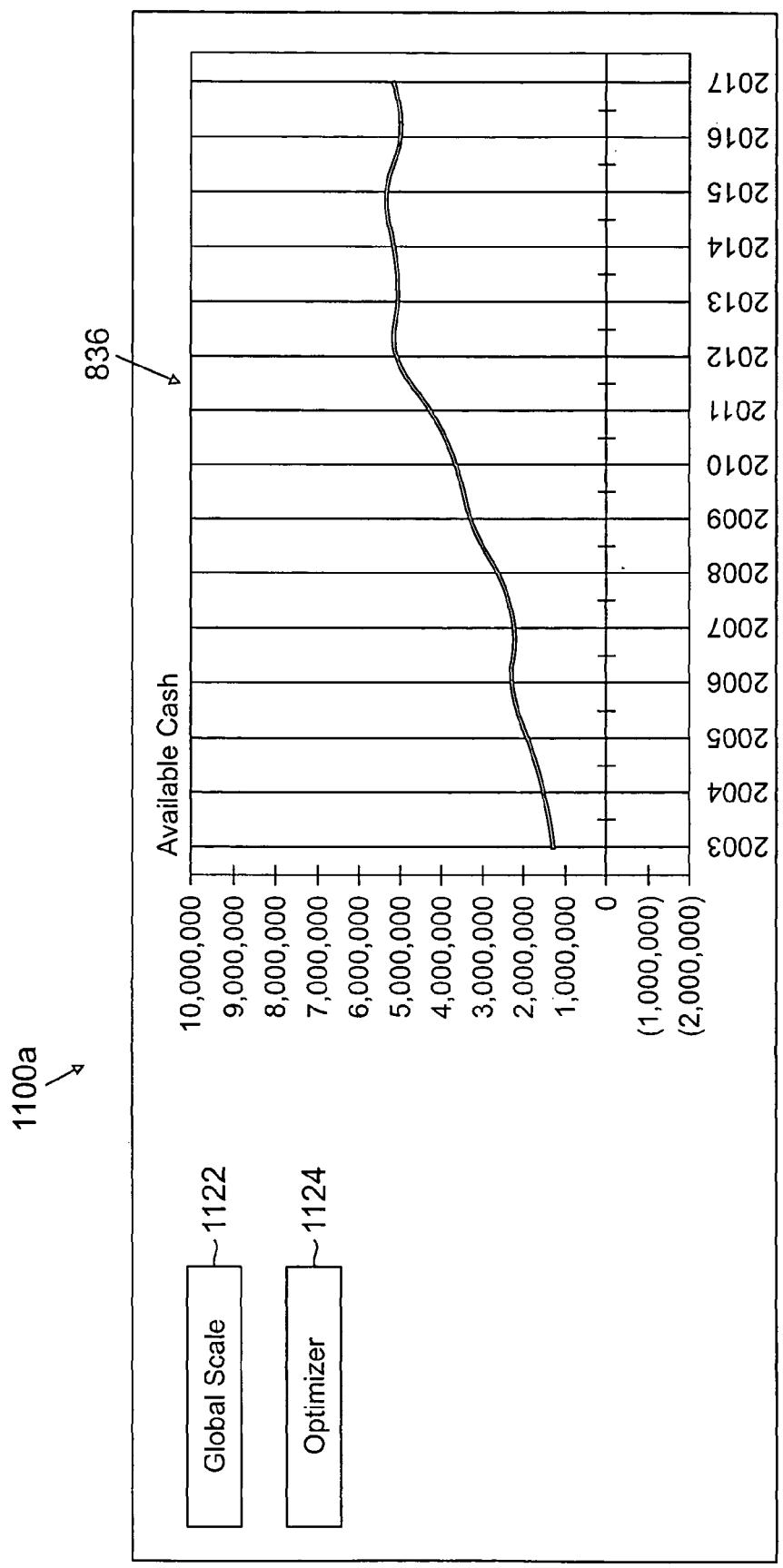

In FIG. 11C, the screenshot 1100a also includes the available cash graph 836 from FIG. 8. In addition, the screenshot 1100a includes a scale button 1122 and an optimization button 1124. The scale button 1122 allows the user to change the scale used in the graph 1102. The optimization button 1124 allows the user to specify constraints on the analysis performed by the host 102. For example, the user could specify that the growth predictions may not involve a growth of more than a specified percentage during the beginning of a construction phase. The user could also specify the maximum rate that the church may grow after that time. The host 102 may use this information to adjust the growth options 302 and propagate the changes to the growth options 302 through the remaining processes performed by the host 102.

Figure 11D:
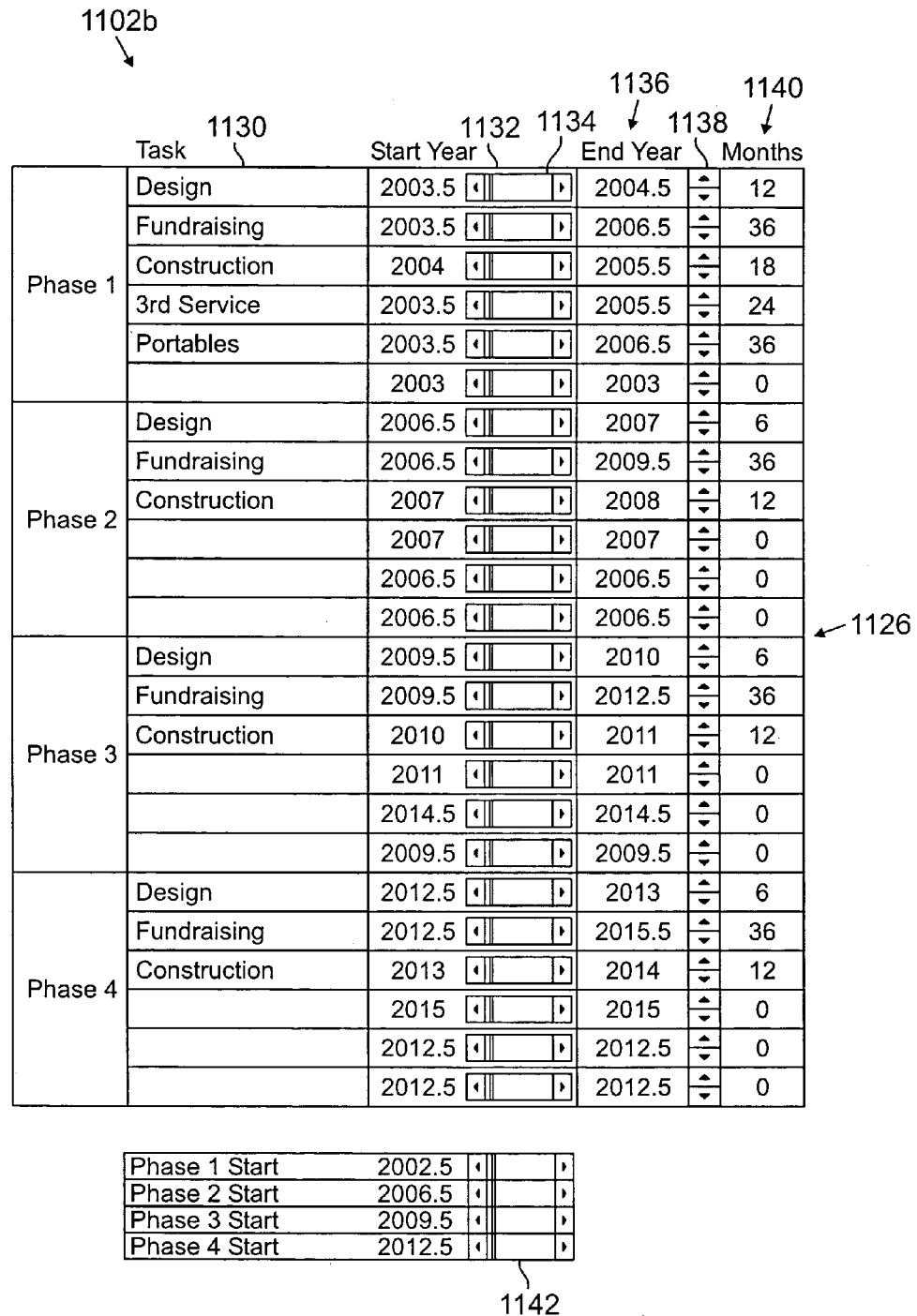
Figure 11E:
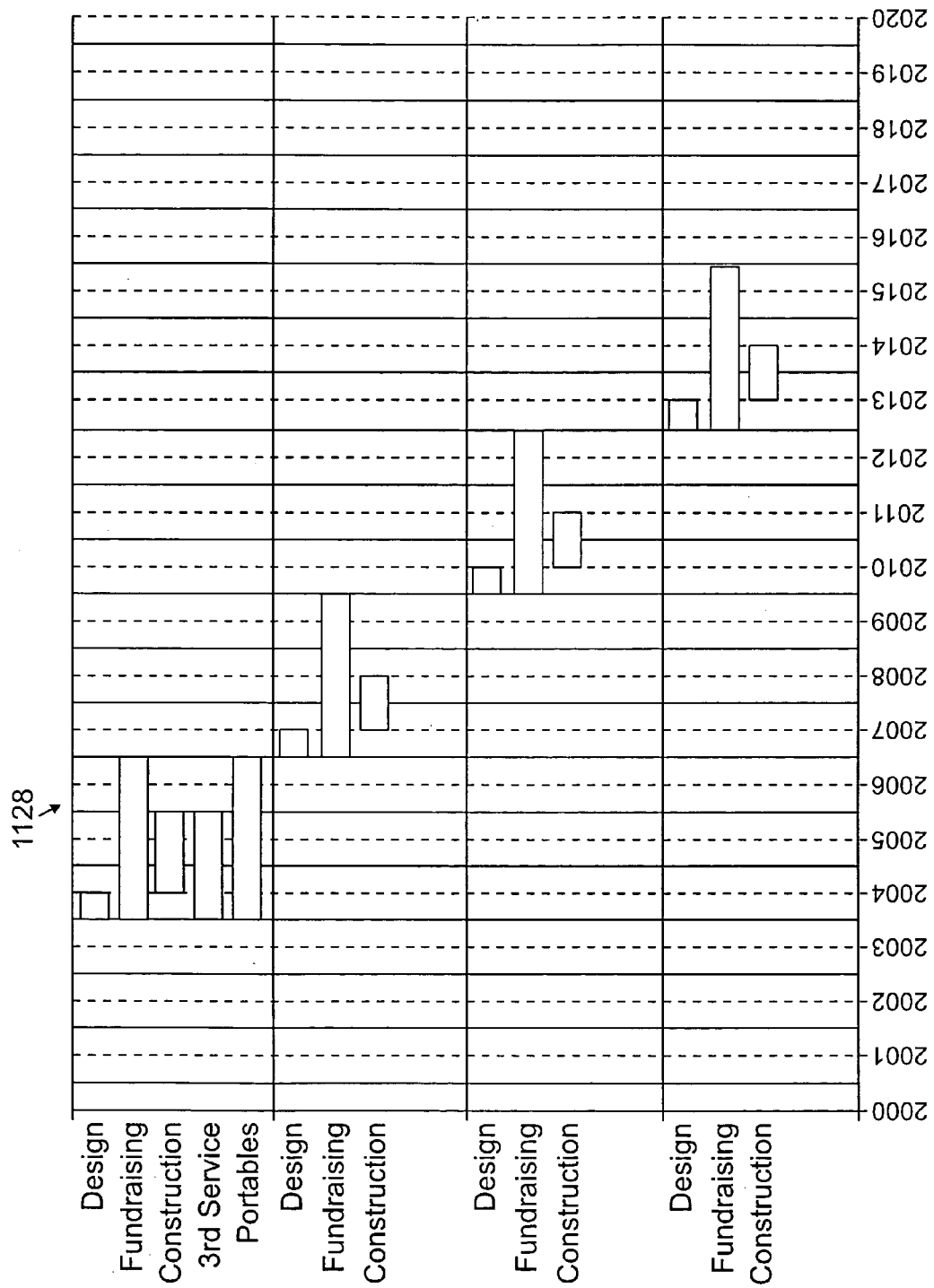

In FIGS. 11D and 11E, another screenshot 1100b is used to summarize a construction plan generated using the information supplied to and/or generated by the host 102. The screenshot 1100b includes a schedule 1126 and a graph 1128 of the schedule. In this example, the schedule 1126 identifies the various tasks 1130 that may occur during each phase of the construction. As particular examples, in the first phase, the schedule 1126 indicates that a third church service would be added and that portable buildings would be used for a specified amount of time.

For each task 1130, the schedule 1126 identifies the starting year 1132 and the ending year 1136, which can be controlled by controls 1134 and 1138, respectively. The schedule 1126 also identifies the length of time 1140 during which the various tasks may occur. The screenshot 1100b also includes slide bars 1142, which allow the user to control when each construction phase begins. The graph 1128 in FIG. 11E provides a visual representation of the schedule 1126.

Although FIGS. 11A through 11E illustrates one example of screenshots 1100 used to summarize the results of the construction planning process, various changes may be made to FIGS. 11A through 11E. For example, any other or additional information could be included in the screenshots 1100. Also, the layout and design of the screenshots 1100 are for illustration only.

This description has described various aspects of a system and method for generating multi-phase construction plans. Various features can be combined or omitted or additional features can be added according to particular needs and without departing from the scope of this disclosure. Example additional features may include the ability to calculate the number of children's teachers and supervisors needed to teach children of various age groups. As a particular example, as described above, the system 100 may estimate the number of children who may attend the church in the future. The user may then specify the number of children to be taught by each teacher and the number of teachers assigned to each supervisor. Using the estimated children's attendance, the system 100 may then calculate the number of teachers and supervisors needed. This information may then be used to help estimate the church's future personnel costs.

As another example, the system 100 may also support a scenario manager. The scenario manager allows a user to import and export different growth scenarios. In one embodiment, the system 100 stores the various information described above in a Microsoft Excel spreadsheet. In this example, the scenario manager takes all of the values and other operable parameters stored in the spreadsheet and writes the values to a file for storage. The scenario manager may also read the values from a file and populate the spreadsheet with the retrieved values. In a particular embodiment, the scenario manager may support password protection for the scenarios, which may be used to limit access to the stored scenarios. In this way, the scenario manager may support the importing and exporting of scenarios more easily than in conventional systems. As a particular example, this may help to reduce the generation and intertwining of a large number of files, which often occurs when multiple scenarios are executed by Microsoft Excel.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method performed in a host computer, the method comprising:
storing in the host computer information identifying a plurality of facilities in a complex, each facility associated with a construction project, wherein the complex comprises a church and at least one of the facilities comprises an auditorium in the church; and
determining, by the host computer, a potential revenue associated with at least one of the facilities;
determining, by the host computer, a cost associated with at least one of the facilities; and
generating, by the host computer, a schedule of the construction projects using the determined potential revenue and the determined cost, wherein the schedule comprises a plurality of phases and any construction project may be performed in any phase, wherein generating a schedule comprises, for each construction project, receiving in the host computer from a user an identification of a phase during which the construction project is to be performed;
wherein determining the potential revenue comprises:
estimating future growth in a number of people attending church services at the church, wherein the future growth is determined using at least one growth estimate, wherein the growth estimate uses a past growth rate of the church and a potential growth rate of the church; and
estimating an amount of donations given to the church during a future time period, wherein the estimated amount of donations is based at least in part on the estimated future growth in the number of people attending the church services due to each of a plurality of potential seating capacity values of the at least one facility.

2. The method of claim 1, wherein determining the cost associated with at least one of the facilities comprises:
identifying a size of at least one of the facilities based on the estimated future growth in attendance; and determining a cost of at least one of the construction projects based on the identified size.

3. The method of claim 1, wherein identifying the plurality of facilities comprises receiving in the host computer an identification of the facilities from a user.

4. The method of claim 1, further comprising identifying a cost of each phase; and
wherein the estimated amount of donations is determined based at least in part on completion of each phase.

5. The method of claim 1, wherein determining the potential revenue associated with at least one of the facilities comprises identifying potential donations to be received during one or more fund-raising campaigns.

6. The method of claim 5, further comprising:
identifying an amount of borrowing needed to pay for the construction projects; and
identifying an amount of debt to be paid off each year.

7. The method of claim 1, further comprising:
receiving in the host computer alterations of data used to generate the schedule from a user; and
showing the user in real time using the host computer how altered data affects the schedule.

8. The method of claim 1, further comprising:
receiving in the host computer a constraint on data used to generate the schedule from a user; and
showing the user in real time using the host computer how the constraint affects the schedule.

9. The method of claim 1, wherein the estimated amount of donations is determined using a factor defining a rate at which at least one of a plurality of newer members of the church generally donate compared to at least one of a plurality of older members of the church.

10. The method of claim 1, wherein the determined potential revenue associated with at least one of the facilities and the determined cost associated with at least one of the facilities are used to estimate a cash flow, the cash flow used to generate the schedule.

11. The method of claim 1, wherein the determined cost associated with at least one of the facilities comprises at least one of operating costs, general and administrative expenses, construction costs, and staffing costs associated with at least one of the facilities.

12. The method of claim 1, wherein estimating the future growth in the number of people attending the church services comprises: limiting a future growth prediction to no more than a specified percentage during a portion of one or more of the phases; and enforcing a different maximum growth rate for the future growth prediction during other times.

13. A system, comprising:
a memory configured to store information identifying a plurality of facilities in a complex, each facility associated with a construction project, wherein the complex comprises a church and at least one of the facilities comprises an auditorium in the church; and
one or more processors collectively configured to:
determine a potential revenue associated with at least one of the facilities;
determine a cost associated with at least one of the facilities; and
generate a schedule of the construction projects using the determined potential revenue and the determined cost, wherein the schedule comprises a plurality of phases and any construction project may be performed in any phase, wherein generating a schedule comprises, for each construction project, receiving from a user an identification of a phase during which the construction project is to be performed;
wherein the one or more processors are collectively configured to determine the potential revenue by:
estimating future growth in a number of people attending church services at the church, wherein the future growth is determined using at least one growth estimate, wherein the growth estimates use a past growth rate of the church and a potential growth rate of the church; and
estimating an amount of donations given to the church during a future time period, wherein the estimated amount of donations is based at least in part on the estimated future growth in the number of people attending the church services due to each of a plurality of potential seating capacity values of the at least one facility.

14. The system of claim 13, wherein:
the one or more processors are collectively configured to determine the cost associated with at least one of the facilities by:
identifying a size of at least one of the facilities based on the estimated future growth in attendance; and
determining the cost associated with at least one of the facilities based on the identified size.

15. The system of claim 13, wherein the one or more processors are collectively configured to generate the schedule by:
identifying a cost of each phase;
wherein the estimated amount of donations is determined based at least in part on completion of each phase.

16. The system of claim 13, wherein:
the one or more processors are collectively configured to determine the potential revenue associated with at least one of the facilities by identifying potential donations to be received during one or more fund-raising campaigns; and
the one or more processors are further collectively configured to:
identify an amount of borrowing needed to pay for the construction projects; and
identify an amount of debt to be paid off each year.

17. The system of claim 13, wherein the one or more processors are further collectively configured to:
receive alterations of data used to generate the schedule from a user; and
show the user in real time how the altered data affects the schedule.

18. The system of claim 13, wherein the potential revenue associated with at least one of the facilities and the identified cost associated with at least one of the facilities are used to estimate a cash flow, the cash flow used to generate the schedule.

19. The system of claim 13, wherein the identified cost associated with at least one of the facilities comprises at least one of operating costs, general and administrative expenses, construction costs, and staffing costs associated with at least one of the facilities.

20. The system of claim 13, wherein the estimated amount of donations is determined using a factor defining a rate at which at least one of a plurality of newer members of the church generally donate compared to at least one of a plurality of older members of the church.

21. A system, comprising:
a memory configured to store information identifying a plurality of facilities in a complex, each facility associated with a construction project, wherein the complex comprises a church and at least one of the facilities comprises an auditorium in the church; and an analysis module comprising one or more processors configured to:
  determine a potential revenue associated with at least one of the facilities;
  determine a cost associated with at least one of the facilities;
  generate a schedule of the construction projects using the determined potential revenue and the determined cost, wherein the schedule comprises a plurality of phases and any construction project may be performed in any phase, wherein generating a schedule comprises, for each construction project, receiving from a user an identification of a phase during which the construction project is to be performed;
  wherein the analysis module is configured to determine the potential revenue by:
  estimating future growth in a number of people attending church services at the church, wherein the future growth is determined using at least one growth estimate, wherein the growth estimate uses a past growth rate of the church and a potential growth rate of the church; and
  estimating an amount of donations given to the church during a future time period, wherein the estimated amount of donations is based at least in part on the estimated future growth in the number of people attending the church services due to each of a plurality of potential seating capacity values of the at least one facility.

22. The system of claim 21, further comprising:
  a constraints module configured to receive a constraint on data used to generate the schedule from a user; and
  an optimization module configured to show the user in real time how the constraint affects the schedule.

23. The system of claim 21, wherein the estimated amount of donations is determined using a factor defining a rate at which at least one of a plurality of newer members of the church generally donate compared to at least one of a plurality of older members of the church.

24. A computer program embodied on a non-transitory computer readable medium, the computer program comprising:
  computer readable program code for identifying a plurality of facilities in a complex, each facility associated with a construction project, wherein the complex comprises a church and at least one of the facilities comprises an auditorium in the church;
  computer readable program code for determining a potential revenue associated with at least one of the facilities;
  computer readable program code for determining a cost associated with at least one of the facilities; and
  computer readable program code for generating a schedule of the construction projects using the determined potential revenue and the determined cost, wherein the schedule comprises a plurality of phases and any construction project may be performed in any phase, wherein generating a schedule comprises, for each construction project, receiving from a user an identification of a phase during which the construction project is to be performed;
  wherein the computer readable program code for determining the potential revenue comprises:
    computer readable program code for estimating future growth in a number of people attending church services at the church, wherein the future growth is determined using at least one growth estimate, wherein the growth estimate uses a past growth rate of the church and a potential growth rate of the church; and
    computer readable program code for estimating an amount of donations given to the church during a future time period, wherein the estimated amount of donations is based at least in part on the estimated future growth in the number of people attending the church services due to each of a plurality of potential seating capacity values of the at least one facility.

25. The computer program of claim 24, wherein the computer readable program code for determining the cost associated with at least one of the facilities comprises:
  computer readable program code for identifying a size of at least one of the facilities based on the estimated future growth in attendance; and
  computer readable program code for determining the cost of at least one of the construction projects based on the identified size.

26. The computer program of claim 24, wherein the computer readable program code for generating the schedule comprises:
  computer readable program code for identifying a cost of each phase;
  wherein the estimated amount of donations is determined based at least in part on completion of each phase.

27. The computer program of claim 24, wherein:
  the computer readable program code for determining the potential revenue comprises computer readable program code for identifying potential donations to be received during one or more fund-raising campaigns; and
  the computer program further comprises:
    computer readable program code for identifying an amount of borrowing needed to pay for the construction projects; and
    computer readable program code for identifying an amount of debt to be paid off each year.

28. The computer program of claim 24, wherein the computer program further comprises:
  computer readable program code for receiving alterations of data used to generate the schedule from a user; and
  computer readable program code for showing the user in real time how the altered data affects the schedule.

29. The computer program of claim 24, wherein the determined potential revenue associated with at least one of the facilities and the determined cost associated with at least one of the facilities are used to estimate a cash flow, the cash flow used to generate the schedule.

30. The computer program of claim 24, wherein the determined cost associated with at least one of the facilities comprises at least one of operating costs, general and administrative expenses, construction costs, and staffing costs associated with at least one of the facilities.

* * * * *